United States Patent
Lamb et al.

(10) Patent No.: US 9,468,221 B2
(45) Date of Patent: Oct. 18, 2016

(54) NON-SETTLING HYDROLYZED WHEY PERMEATE CONCENTRATE AND RELATED METHODS AND NUTRITIONAL COMPOSITIONS

(71) Applicant: Milk Specialties Company, Eden Prairie, MN (US)

(72) Inventors: Steve C. Lamb, Rolla, MO (US); Steve Hollins, Plymouth, WI (US)

(73) Assignee: MILK SPECIALTIES COMPANY, Carpentersville, IL (US)

(*) Notice: Subject to any disclaimer, the term of this patent is extended or adjusted under 35 U.S.C. 154(b) by 0 days.

(21) Appl. No.: 13/917,340

(22) Filed: Jun. 13, 2013

(65) Prior Publication Data
US 2014/0161933 A1    Jun. 12, 2014

Related U.S. Application Data

(63) Continuation of application No. 12/729,055, filed on Mar. 22, 2010, now abandoned.

(60) Provisional application No. 61/162,164, filed on Mar. 20, 2009, provisional application No. 61/162,178, filed on Mar. 20, 2009.

(51) Int. Cl.
| | |
|---|---|
| A23C 21/00 | (2006.01) |
| A23C 17/00 | (2006.01) |
| A23C 9/12 | (2006.01) |
| A23C 1/00 | (2006.01) |
| A23C 9/00 | (2006.01) |
| A23C 9/154 | (2006.01) |
| A23C 9/16 | (2006.01) |
| A23C 21/02 | (2006.01) |
| A23C 1/12 | (2006.01) |

(52) U.S. Cl.
CPC ............... *A23C 21/023* (2013.01); *A23C 1/12* (2013.01); *A23K 10/28* (2016.05); *A23K 20/147* (2016.05); *A23K 50/10* (2016.05); *A23C 9/1209* (2013.01); *A23C 9/1544* (2013.01); *A23C 21/02* (2013.01); *A23C 21/026* (2013.01); *Y02P 60/875* (2015.11)

(58) Field of Classification Search
USPC ...................................................... 426/573
See application file for complete search history.

(56) References Cited

U.S. PATENT DOCUMENTS

| | | |
|---|---|---|
| 4,016,296 A | 4/1977 | DeSantis |
| 4,062,988 A | 12/1977 | DeSantis |
| 4,198,294 A | 4/1980 | Deane |

(Continued)

FOREIGN PATENT DOCUMENTS

WO    WO 2006087391 A1 *    8/2006

OTHER PUBLICATIONS

Guy et al., "Preparation and Properties of Sirups Made by Hydrolysis of Lactose". Journal of Dairy Science vol. 61, No. 5 (1978).*

(Continued)

*Primary Examiner* — Erik Kashnikow
*Assistant Examiner* — Assaf Zilbering
(74) *Attorney, Agent, or Firm* — Mueting, Raasch & Gebhardt, P.A.

(57) ABSTRACT

The present invention includes a method of producing non-settling hydrolyzed whey permeate with an enzyme, the non-settling hydrolyzed whey permeate concentrate, and nutritive additives and foods made therefrom.

8 Claims, 42 Drawing Sheets

(56) References Cited

U.S. PATENT DOCUMENTS

| | | |
|---|---|---|
| 4,221,818 A | 9/1980 | Schroeder |
| 4,642,317 A | 2/1987 | Palmquist et al. |
| 4,826,694 A | 5/1989 | McAskie |
| 4,853,233 A | 8/1989 | McAskie |
| 4,909,138 A | 3/1990 | McAskie |
| 5,032,509 A | 7/1991 | Matsumoto |
| 5,234,701 A | 8/1993 | Cummings et al. |
| 5,382,678 A | 1/1995 | Vinci et al. |
| 5,656,309 A | 8/1997 | Sawhill |
| 5,783,714 A | 7/1998 | McKenna et al. |
| 6,033,689 A | 3/2000 | Waterman et al. |
| 6,229,031 B1 | 5/2001 | Strohmaier et al. |
| 6,576,667 B2 | 6/2003 | Strohmaier et al. |
| 6,774,252 B2 | 8/2004 | Strohmaier et al. |
| 6,777,014 B2 | 8/2004 | Singh |
| 7,318,943 B2 | 1/2008 | Baricco et al. |
| 2008/0107767 A1 | 5/2008 | Hueting |
| 2009/0004360 A1 | 1/2009 | Bingley |
| 2009/0068289 A1 | 3/2009 | Levinson et al. |
| 2009/0220638 A1 | 9/2009 | Pablos Perez |
| 2010/0239709 A1 | 9/2010 | Lamb et al. |
| 2010/0255147 A1 | 10/2010 | Lamb et al. |

OTHER PUBLICATIONS

Burkhalter et al., "Cheese, Processed Cheese, and Whey—Ullmann's Encyclopedia of Industrial Chemistry". Ullmann's Encyclopedia of Industrial Chemisty. vol. 8. Published online Jun. 15, 2000.*

"Pure-Dent Plating Starch" Available online at www.gainprocessing.com on Jan. 31, 2001.*

"PureDent". Plating Starch Available online at www.grainprocessing.com on Jan. 31, 2001.*

Guy et al., 'Preparation and Properties of Sirups Made by Hydrolysis of Lactose' J. Dairy Science, 1978, vol. 61, pp. 542-549; Fig. 1, 2, 7; p. 544, col. 1, para 2; p. 544, col. 2, para 1.

* cited by examiner

LAC Plant Trials 1 & 2 HPLC Data

| Sample | | Plant Trial #1 | Plant Trial #2 |
|---|---|---|---|
| Lactose Source | | 20% Permeate | 20% Permeate |
| Enzyme Level | | 0.50% | 0.50% |
| | Hrs | Concentrate | Concentrate |
| Lactose (+GOS Disaccharide) (gm/l) | 1st rep | 82.02 | 75.18 |
| | 2nd rep | 82.30 | 75.21 |
| | AVG | 82.16 | 75.19 |
| Glucose (gm/l) | 1st rep | 40.83 | 44.11 |
| | 2nd rep | 40.96 | 44.14 |
| | AVG | 40.90 | 44.13 |
| Galactose (gm/l) | 1st rep | 41.56 | 46.22 |
| | 2nd rep | 41.65 | 46.24 |
| | AVG | 41.60 | 46.23 |
| GOS-Trisaccharide (gm/l) | 1st rep | 12.69 | 13.77 |
| | 2nd rep | 12.74 | 13.77 |
| | AVG | 12.72 | 13.77 |
| %Lactose Hydrolyzed (based on Glucose-160 start) | (molar) | 48.56% | 52.40% |

Figure 8

| | | | |
|---|---|---|---|
| 3/16/2009 | | | |
| Lactose hydrolysis | (17-20%Perm-pH6.5 0.5% lactase at 95 F for 12 hours - Evap) | | |
| | To develop plant-scale process for 75% (solids) hydrolysis as molasses replacement | | |
| Experiment Number. | 09-003, #6 | | |
| | pasteurize the permeate | | |
| | hydrolyze the 17-20% permeate with lactase at pH 6.5, 95 F for 12+ hours | | |
| | evaporate the hydrolysis to 70-80% as finished products through MVR and TVR | | |
| 35,500 lbs Permeate with 17-20% solids (using 17-20% permeate off the R/O) | | | |
| 32.5 lbs Lactozyme | | | |
| | | lbs | pH | Time |
| Pasteurized 17-20% Permeate - 95 F, pH 6.5 with 0.5% Lacozyme3000L (1 dosing) for 12+ hrs, then evaporation to 75% solids | | | |
| | Pasteurize the permeate - heat up to 150 F/1 hr (160 F/20-30 min) and cold down to 95 F in a A tank | | | |
| | CIP and sanitize C12. | | | |
| | Transfer the pasteurized permeate into C12 | | | 10:30 AM |
| | Adjust pH to 6.5 with 50% caustic | 127.6 | 6.51 | |
| | Add 32.5 lbs of Lactozyme3000L to 32.5 lbs of water and mix well. Add to C12. | | | 10:50 AM |
| | Check pH and adjust pH if necessary | | 6.36 | 2:30 PM |
| | Check pH and adjust pH if necessary | | 6.33 | 4:30 PM |
| | Check pH and adjust pH if necessary | | 6.26 | 10:30 PM |
| | Finish the hydrolysis at 95 F for 12 hrs if pH <5.9, if pH >5.9 hydrolyze for another 4 hours | | | evaporated at 4:03 AM |
| | Evaporate to 70-80% Solids through MVR and TVR | | | 75% |
| | Fill the 70-80% hydrolysis in totes at 140 F | | | |

| | | | | | | |
|---|---|---|---|---|---|---|
| | Cool to 35C while mixing | | | | | |
| | Adjust pH to 6.5 with NaOH or HCl while mixing | | | | | |
| | Record pH and control pH at 6.5 | | | | | |
| | Add 0.85 gm Lactozyme3000 to 50 ml water in beaker and mix well | | | | | |
| | Add well mixed Lactozyme3000 to 20% Permeate at 35C while mixing | | | | | |
| | At 0, 3, 6, 9 and 12 hrs after Lactozyme3000 addition sample for HPLC Sugar Assays (see Sugar Test Sample Prep Tab) - LAC-090209-B0,B3,B6,B9,B12 | | | | | |
| | At 0, 3, 6, 9 and 12 hrs after Lactozyme addition - Take a samples for 80% and 60% Evap, drop pH to 4.0 with Conc HCl and Rotovap first to 80% solids - If no sediment, Stop and do not rotovap to 60% solids. If sediment rotovap second sample to 60% solids. Use designated amount above (200gm --> 50gm for 80% adn 150.38gm --> 50gm for 60%) - Label LAC-090209-B3-80/60, -B6-80/60, -B9-80/60 and -B12-80/60 for 80% and if necessary 60% solids, respectively. | | | | | |
| | DO NOT do Viscosity on 60 and 80% solids samples | | | | | |
| | Store 80% and if necessary 60% solids samples in cold and take pics at 1 day and periodically over next week | Wt Flask | Target Wt | % Solids | | |
| | Pre-weigh 1 liter Rotovap flask | | | | | |
| | Record weight of Rotovap flask | | | | | |
| | Transfer Calculated gm (see above) into 1 liter Rotovap flask and refrigerate remainder of reaction mixture for higher % solids tests | | | | | |
| | Do % Solids on sample from remaining "20% Solids" mixture | | | | | |
| C | 20% Permeate - 70C, 30 min - Then 0.1%Lactozyme3000 at 35C, pH6.5(w/HCl)-Then pH4.0(w/HCL), Evap to 60 & 80% Solids | ml | pH | Time | | |
| | Add 1700 gm DI water to glass reactor in water bath such that reaction mix temp is 75C | | | | | |
| | Add 425 gm dried Permeate slowly to reactor while mixing until all Permeate is wetted and evenly suspended | | | | | |
| | Mix at 70C for 30 min | | | | | |
| | Cool to 35C while mixing | | | | | |
| | Adjust pH to 6.5 with NaOH or HCl while mixing | | | | | |
| | Record pH and control pH at 6.5 | | | | | |
| | Add 0.43 gm Lactozyme3000 to 50 ml water in beaker and mix well | | | | | |
| | Add well mixed Lactozyme3000 to 20% Permeate at 35C while mixing | | | | | |
| | At 0, 3, 6, 9 and 12 hrs after Lactozyme3000 addition sample for HPLC Sugar Assays (see Sugar Test Sample Prep Tab) - LAC-090209-C0,C3,C6,C9,C12 | | | | | |
| | At 0, 3, 6, 9 and 12 hrs after Lactozyme addition - Take a samples for 80% and 60% Evap, drop pH to 4.0 with Conc HCl and Rotovap first to 80% solids - If no sediment, Stop and do not rotovap to 60% solids. If sediment rotovap second sample to 60% solids. Use designated amount above (200gm --> 50gm for 80% adn 150.38gm --> 50gm for 60%) - Label LAC-090209-C3-80/60, -C6-80/60, -C9-80/60 and -C12-80/60 for 80% and if necessary 60% solids, respectively. | | | | | |
| | DO NOT do Viscosity on 60 and 80% solids samples | | | | | |
| | Store 80% and if necessary 60% solids samples in cold and take pics at 1 day and periodically over next week | Wt Flask | Target Wt | % Solids | | |
| | Pre-weigh 1 liter Rotovap flask | | | | | |
| | Record weight of Rotovap flask | | | | | |
| | Transfer Calculated gm (see above) into 1 liter Rotovap flask and refrigerate remainder of reaction mixture for higher % solids tests | | | | | |
| | Do % Solids on sample from remaining "20% Solids" mixture | | | | | |

Figure 10 (Cont'd)

Na2SO3 Calculator

| Na2SO3 | | |
|---|---|---|
| | 126.04 | g/mole |
| % of Soy | 3.00% | % of Soy |
| gm/Liter | 12.75 | g Na2SO3/liter |
| Molar | 0.1012 | mole Na2SO3/liter |

| | | |
|---|---|---|
| Water (gm) | 1,700.00 | |
| Permeate | 425.00 | |
| | 0.00 | |
| Lactozyme3000 | 2.1250 | |
| | 0.0000 | |
| | 0.0000 | |
| | 0.00 | |
| Solids (pph) | 25.00 | |
| Solids (%) | 20.00% | |

| Na2SO3 | | |
|---|---|---|
| | 126.04 | g/mole |
| % of Soy | 2.00% | % of Soy |
| gm/Liter | 8.5 | g Na2SO3/liter |
| Molar | 0.0674 | mole Na2SO3/liter |

| | | |
|---|---|---|
| Water (gm) | 1,700.00 | |
| Permeate | 425.00 | |
| | 0.00 | |
| Lactozyme3000 | 0.8500 | |
| | 0.0000 | |
| | 0.0000 | |
| | 0.00 | |
| Solids (pph) | 25.00 | |
| Solids (%) | 20.00% | |

| Na2SO3 | | |
|---|---|---|
| | 126.04 | g/mole |
| % of Soy | 1.00% | % of Soy |
| gm/Liter | 4.25 | g Na2SO3/liter |
| Molar | 0.0337 | mole Na2SO3/liter |

| | | |
|---|---|---|
| Water (gm) | 1,700.00 | |
| Permeate | 425.00 | |
| | 0.00 | |
| Lactozyme3000 | 0.4250 | |
| | 0.0000 | |
| | 0.0000 | |
| | 0.00 | |
| Solids (pph) | 25.00 | |
| Solids (%) | 20.00% | |

Assumptions for LAC:
Lactozyme3000L = 3000 LAU/ml (1 LAU = 1 umole glucose/min) (Sigma price = $129.50/250ml)
(pH6.5 / 37C / 4.5% w/w Lactose / 30 min / 0.035-0.1LAU/gm)

1 ml Lactozyme3000L → $3 \times 10^3$ umoles lactose * 1 mole lactose/$10^6$ umoles lactose * 342 gm lactose/mole lactose = 1.026 gm lactose/min Therefore, for 1% enzyme loading (1 gm Lactozyme3000L/100 gm lactose) it will take approx 100 min to hydrolyze 100 gm lactose)

| Experiment Number: | LAC-090209 |
| --- | --- |
| | (20%Perm-0.5,0.2,0.1% Lactozyme3000-35C,pH6.5,12hrs-HPLC,pH4,Evap) |
| Glucose Test Sample Prep | |
| 1 | Place 5 ml sample aliquot in 15 ml centrifuge tube |
| 2 | Add 0.1 ml 10% HCl to sample and mix. (Enzyme kill step - should drop pH to <3. May have to adjust amount of acid) |
| 3 | Dilute until no solids are visible, no cloudiness = clear solution |
| 4 | Adjust pH to <4 with HCl if necessary |
| 5 | DO NOT FILTER, store in refrigerator for HPLC analysis |

Figure 12 (cont.)

| LAC-090209 | (20%Perm-0.5,0.2,0.1% Lactozyme,3000-35C, pH6.5,12hrs-HPLC, pH4.Evap) | | | |
|---|---|---|---|---|
| | % Lactase | % solids1 | %solids2 | %solids3eohts(AVG) |
| LAC090209-A0 | 0.50 | | | #DIV/0! |
| LAC090209-A3-80 | 0.50 | | | #DIV/0! |
| LAC090209-A3-80 | 0.50 | | | #DIV/0! |
| LAC090209-A6-80 | 0.50 | | | #DIV/0! |
| LAC090209-A6-80 | 0.50 | | | #DIV/0! |
| LAC090209-A9-80 | 0.50 | | | #DIV/0! |
| LAC090209-A9-80 | 0.50 | | | #DIV/0! |
| LAC090209-A12-80 | 0.50 | | | #DIV/0! |
| LAC090209-A12-80 | 0.50 | | | #DIV/0! |
| LAC090209-B0 | 0.20 | | | #DIV/0! |
| LAC090209-B3-80 | 0.20 | | | #DIV/0! |
| LAC090209-B3-80 | 0.20 | | | #DIV/0! |
| LAC090209-B6-80 | 0.20 | | | #DIV/0! |
| LAC090209-B6-80 | 0.20 | | | #DIV/0! |
| LAC090209-B9-80 | 0.20 | | | #DIV/0! |
| LAC090209-B9-80 | 0.20 | | | #DIV/0! |
| LAC090209-B12-80 | 0.20 | | | #DIV/0! |
| LAC090209-B12-80 | 0.20 | | | #DIV/0! |
| LAC090209-C0 | 0.10 | | | #DIV/0! |
| LAC090209-C3-80 | 0.10 | | | #DIV/0! |
| LAC090209-C3-80 | 0.10 | | | #DIV/0! |
| LAC090209-C6-80 | 0.10 | | | #DIV/0! |
| LAC090209-C6-80 | 0.10 | | | #DIV/0! |
| LAC090209-C9-80 | 0.10 | | | #DIV/0! |
| LAC090209-C9-80 | 0.10 | | | #DIV/0! |
| LAC090209-C12-80 | 0.10 | | | #DIV/0! |
| LAC090209-C12-80 | 0.10 | | | #DIV/0! |

| | | | | | |
|---|---|---|---|---|---|
| Cool to 35C while mixing | | | | | |
| Adjust pH to 6.5 with NaOH or HCl while mixing | | | | | |
| Record pH and control pH at 6.5 | | | | | |
| Add 0.85 gm Lactozyme3000 to 50 ml water in beaker and mix well | | | | | |
| Add well mixed Lactozyme3000 to 20% Permeate at 35C while mixing | | | | | |
| At 0, 3, 6, 9 and 12 hrs after Lactozyme3000 addition sample for HPLC Sugar Assays (see Sugar Test Sample Prep Tab) - LAC-090209-B0,B3,B6,B9,B12 | | | | | |
| At 0, 3, 6, 9 and 12 hrs after Lactozyme addition - Take a samples for 80% and 60% Evap, drop pH to 4.0 with Conc HCl and Rotovap first to 80% solids - If no sediment, Stop and do not rotovap to 60% solids. If sediment rotovap second sample to 60% solids. Use designated amount above (200gm --> 50gm for 80% adn 150.38gm --> 50gm for 60%) - Label LAC-090209-B3-80/60, -B6-80/60, -B9-80/60, and -B12-80/60 for 80% and if necessary 60% solids, respectively. | | | | | |
| DO NOT do Viscosity on 60 and 80% solids samples | | | | | |
| Store 80% and if necessary 60% solids samples in cold and take pics at 1 day and periodically over next week | Wt Flask | Target Wt | | | % Solids |
| Pre-weigh 1 liter Rotovap flask | | | | | |
| Record weight of Rotovap flask | | | | | |
| Transfer Calculated gm (see above) into 1 liter Rotovap flask and refrigerate remainder of reaction mixture for higher % solids tests | | | | | |
| Do % Solids on sample from remaining "20% Solids" mixture | | | | | |
| C 20% Permeate - 70C, 30 min - Then 0.1%Lactozyme3000 at 35C, pH6.5(w/HCl)-Then pH4.0(w/HCL), Evap to 60 & 80% Solids | ml | | pH | | Time |
| Add 1700 gm DI water to glass reactor in water bath such that reaction mix temp is 75C | | | | | |
| Add 425 gm dried Permeate slowly to reactor while mixing until all Permeate is wetted and evenly suspended | | | | | |
| Mix at 70C for 30 min | | | | | |
| Cool to 35C while mixing | | | | | |
| Adjust pH to 6.5 with NaOH or HCl while mixing | | | | | |
| Record pH and control pH at 6.5 | | | | | |
| Add 0.43 gm Lactozyme3000 to 50 ml water in beaker and mix well | | | | | |
| Add well mixed Lactozyme3000 to 20% Permeate at 35C while mixing | | | | | |
| At 0, 3, 6, 9 and 12 hrs after Lactozyme3000 addition sample for HPLC Sugar Assays (see Sugar Test Sample Prep Tab) - LAC-090209-C0,C3,C6,C9,C12 | | | | | |
| At 0, 3, 6, 9 and 12 hrs after Lactozyme addition - Take a samples for 80% and 60% Evap, drop pH to 4.0 with Conc HCl and Rotovap first to 80% solids - If no sediment, Stop and do not rotovap to 60% solids. If sediment rotovap second sample to 60% solids. Use designated amount above (200gm --> 50gm for 80% adn 150.38gm --> 50gm for 60%) - Label LAC-090209-C3-80/60, -C6-80/60, -C9-80/60 and -C12-80/60 for 80% and if necessary 60% solids, respectively. | | | | | |
| DO NOT do Viscosity on 60 and 80% solids samples | | | | | |
| Store 80% and if necessary 60% solids samples in cold and take pics at 1 day and periodically over next week | Wt Flask | Target Wt | | | % Solids |
| Pre-weigh 1 liter Rotovap flask | | | | | |
| Record weight of Rotovap flask | | | | | |
| Transfer Calculated gm (see above) into 1 liter Rotovap flask and refrigerate remainder of reaction mixture for higher % solids tests | | | | | |
| Do % Solids on sample from remaining "20% Solids" mixture | | | | | |

Figure 25 (Cont'd)

| Sample # | Hydrol Estim % | % Solids | 90F | 40F | 5F |
|---|---|---|---|---|---|
| Temp | | % | 90 | 40 | 5 |
| LAC-100208-A3hr-60 | 60 | 63.7 | 3.5 | 3.8 | 43.0 |
| LAC-100208-A3hr-70 | 60 | 73.7 | 20.2 | 32.9 | |
| LAC-100208-A3hr-80 | 60 | 82.2 | 46.6 | | |
| LAC-100208-B6hr-60 | 70 | 60.4 | 2.1 | 2.0 | 12.9 |
| LAC-100208-B6hr-70 | 70 | 73.4 | 20.1 | 24.0 | |
| LAC-100208-B6hr-80 | 70 | 83.0 | 75.4 | | |
| LAC-100208-C12hr-60 | 80 | 63.6 | 3.3 | 3.2 | 17.8 |
| LAC-100208-C12hr-70 | 80 | 70.0 | | 18.0 | |
| LAC-100208-C12hr-80 | 80 | 79.1 | 14.4 | | |
| Molasses | | 69.8 | 18.7 | 64.1 | 120.0 |
| HP-Settling Sample | | 72.0 | 4.2 | 20.2 | 120.0 |

Figure 38

NON-SETTLING HYDROLYZED WHEY PERMEATE CONCENTRATE AND RELATED METHODS AND NUTRITIONAL COMPOSITIONS

RELATED APPLICATION DATA

This application is a continuation of U.S. patent application Ser. No. 12/729,055, filed Mar. 22, 2010, which claims the priority benefit of U.S. Provisional Patent Application Ser. Nos. 61/162,164, filed Mar. 20, 2009, and 61/162,178, filed Mar. 20, 2009, which are hereby incorporated herein in their entirety by reference.

TECHNICAL FIELD

The present invention relates to whey permeate hydrolysate concentrates for nutritional supplement compositions and foodstuffs that may be used for livestock and humans, and methods of their production and use.

BACKGROUND OF THE INVENTION

Whey comes from the manufacture of cheese. Whey permeate (sometimes also referred to as permeate processed whey) comes from a process of removing at least some of the protein from whey. The whey permeate is usually condensed to remove at least some of the water. A typical condensed whey permeate comprises about 35-45% by weight total solids, of which total solids about 75-80% by weight is lactose.

It is beneficial to produce whey permeate hydrolysate concentrates for use in a wide variety of animal and human foodstuffs and nutritional compositions and supplements. These uses include use of whey permeate hydrolysate concentrates as substitutes for other components of foodstuffs and nutritional compositions.

One of the difficulties in the transport and use of whey permeate hydrolysate concentrates is that the liquid products are subject to sedimentation such that they cannot perform as desirable in a wide variety of industrial and agricultural uses that may require storage or transport over time and temperature profiles where sedimentation occurs, thus preventing their benefits from being realized.

In addition, liquid whey permeate hydrolysate concentrates also may be of such high viscosity that they can be unsuitable for industrial and agricultural uses that involve pumping, conduit transport or pouring.

Accordingly, where it is desired to use liquid whey permeate hydrolysate concentrates in industrial food production, such as in the production of animal feeds or food preparation processes, it is beneficial to be able to provide liquid whey permeate hydrolysate concentrates that have beneficial solids contents, while maintaining sufficiently good viscosity and resistance to sedimentation that they may be pumped, transferred by conduit or poured in industrial settings.

Accordingly, there remains a need for whey permeate hydrolysate concentrates that offer all of the nutritional benefits of hydrolyzed lactose and resultant galactooligosaccharides (GOS), but likewise offer an advantageous collection of concomitant physical properties, such as high solids, as well as suitable viscosity and resistance to sedimentation over typical storage periods and within temperature ranges experienced in various storage and transportation conditions, and in application climates.

SUMMARY OF THE INVENTION

The present invention includes a method for producing non-settling hydrolyzed whey permeate concentrate, the hydrolyzed whey permeate concentrate produced thereby, and nutritive products containing same or produced therefrom.

The present invention also includes nutritional supplement and additive compositions in liquid or solid form that may be used in a wide variety of human and livestock applications and the like, such as for livestock feed mixture. Also included are methods of preparing the nutritional supplement and additive compositions, as well foodstuffs, using hydrolyzed whey permeates made in accordance with the present invention.

The present invention includes hydrolyzed whey permeate concentrates that may be rendered into a solid form, and which as liquids exhibit improved bulk handling and storage properties, as well as improved flow and non-settling properties, and which can be processed through liquid handling equipment, such as through pumps, conduits and the like.

The characteristics of the non-settling hydrolyzed whey permeate (NHWP) prepared in accordance with this embodiment of the present invention include the ability to concentrate a hydrolyzed whey permeate to a pumpable, pourable, non-settling liquid, most preferably with 75-80% solids.

As to the non-settling parameters of the liquid composition of the present invention, these compositions have a sedimentation rate such that the liquid product may be held at 90 F for at least two weeks with no appreciable sedimentation, preferably up to four weeks and beyond.

Method of Producing a Non-Settling Hydrolyzed Whey Permeate

The present invention includes a method of producing a non-settling hydrolyzed whey permeate with an enzyme, the method comprising the steps: (a) subjecting the whey permeate having an initial solids content in the range of from about 15 to about 25 percent solids to hydrolysis by an enzyme, so as to obtain a whey permeate hydrolysate having a degree of hydrolysis above about 65 percent and preferably between about 65 percent and about 80 percent, and (b) subjecting the whey permeate hydrolysate to evaporation so as to bring the level of solids in the whey permeate hydrolysate to within a range of from about 60 to about 80 percent solids, so as to obtain a whey permeate hydrolysate concentrate whose settling profile is such that there is no detectable settling over two weeks when stored at 90 degrees F.°, which corresponds to a pellet volume of approx 0.2-0.4 ml as measured in the specified Centrifuge Settling Test.

The parameters of the Centrifuge Settling Test are as follows:
1. Table top centrifuge
2. 1,250 RPM
3. Radius 14 cm.
4. Calculated G force: 244 g
5. Test temperature 75 F
6. Pellet volume measured vs. time.

The present invention include a method of producing a non-settling hydrolyzed whey permeate with an enzyme, the method comprising the steps: (a) maintaining whey permeate having an initial solids content in the range of from about 15 to about 25 percent solids in a reaction vessel at a temperature in the range of from about 70° to about 80° C. for a period in the range of from about 15 to about 45 minutes; (b) cooling the whey permeate to within a temperature range at which the enzyme is reactive; (c) subjecting the whey permeate to hydrolysis by the enzyme at a temperature in the range of from about 25° to about 50° C. and at a pH in the range of from about 5.0 to about 7.5 for a period of time in the range of from about 3 to about 24 hours, so as to obtain a whey permeate hydrolysate; (i.e., the reaction mixture need only be in the pH and temperature range of any chosen lactase enzyme—e.g. fungal could be as low as pH3, some thermophylic lactases (not yet commercially available) could be as high as 60° C.); (d) subjecting the whey permeate hydrolysate to evaporation so as to bring the level of solids in the whey permeate hydrolysate to within a range of from about 60 to about 80 percent solids, so as to obtain a whey permeate hydrolysate whose settling profile is such that there is no detectable settling over two weeks when stored at 90 deg F.°, which corresponds to a pellet volume of approx 0.2-0.4 ml as measured in the specified Centrifuge Settling Test.

It is preferred that the whey permeate has an initial solids content in the range of from about 18 to about 20 percent solids. The preferred enzyme concentration is in the range of from about 0.08%-0.12% of the reaction mixture for this solids range.

It is also preferred that the hydrolysis by the enzyme is carried out at a temperature in the range of a temperature in the range of from about 25° to about 50° C. and at a pH in the range of from about 5.0 to about 7.5 for a period of time in the range of from about 3 to about 24 hours, most preferably from about 35° to about 40° C., and that the hydrolysis by the enzyme is carried out at a pH in the range of from about 6.5 to about 7.0.

The hydrolysis reaction typically will be carried out for a period of time in the range of from about 4 to about 16 hours, preferably 12-16 hours. Typically, the degree of hydrolysis will be above about 65 percent, and preferably in the range of from about 65 percent to about 80 percent. In addition, under the prescribed enzymatic concentration, the liquid whey permeate hydrolysate condensate will have a galactooligosaccharides (GOS) content in the range of about 3% to 5% by weight.

The evaporation step may be carried out so as to bring the level of solids in the whey permeate hydrolysate condensate to within a range of from about 65 to about 80 percent solids, preferably 70-75 percent solids.

Non-Settling Hydrolyzed Whey Permeate

The present invention also includes a liquid whey permeate hydrolysate condensate composition made in accordance with the method of the present invention.

The present invention includes a liquid whey permeate hydrolysate condensate composition comprising a non-settling hydrolyzed whey permeate, wherein the whey permeate hydrolysate has a degree of hydrolysis in the range of from about 65 percent to about 80 percent, contains solids within a range of from about 65 to about 80 percent solids, preferably 70-75 percent solids, and resists settling for at least 2 weeks when maintained at 90 degrees F. The liquid composition also has a viscosity in the range of from about 20 milli-Pascals (or centipoise) at 90 degrees F. to about 120 milli-Pascals (or centipoise) at 5 degrees F. as measured by a Brookfield Viscometer.

Method of Producing a Dry Product from Non-Settling Hydrolyzed Whey Permeate

The present invention also includes a method of producing a dried product from a non-settling hydrolyzed whey permeate with an enzyme, the method comprising the steps as described above and further adding a drying agent to the whey permeate hydrolysate so as to obtain a dry product. The drying agent may be any substance appropriate to the desired nutritional application, and examples are those selected from the group consisting of maltodextrins and starches.

As to the physical characteristics that make the liquid compositions of the present invention beneficial in terms of being able to be pumped and poured, these compositions have a viscosity in the range of from about 90 to about 130 centipoise at 90 F.°.

Nutritional Supplements, Components, Food Products and Related Methods

The method of the present invention allows the production of a "milk syrup" liquid which is a pumpable, pourable, non-settling liquid preferably at 75-80% solids and which contains hydrolyzed lactose components and milk minerals.

The present invention also allows for the production of a dry product with same composition as the liquid concentrate produced in accordance with the present invention. This may be done with the aid of the addition of a drying aid, such as maltodextrin, starch or other well known drying aids. The present invention therefore includes methods of producing nutritional supplements, compositions and foodstuffs using the dried form of the liquid product composition of the present invention, the compositions themselves, and methods of their use.

The dry product composition of the present invention may be used in place of a corn syrup solids replacement for ice cream and other food applications. The present invention includes methods of producing nutritional supplements, compositions and foodstuffs using the liquid product composition of the present invention as a corn syrup solids substitute, the compositions themselves, and methods of their use.

The liquid product composition of the present invention may be used as a brown rice syrup replacement in foods products as is known in the art, such as for nutrition/protein bars and the like which offer a reduced glycemic index relative to sucrose or corn syrup solids. Examples of brown rice syrup uses include use as a sweetener, or for making baked goods such cookies, crisps, granola, pies, and puddings, and may be combined with another sweetener such as maple for cakes. Thus, the present invention includes methods of producing nutritional supplements, compositions and foodstuffs using the liquid product composition of the present invention as a brown rice syrup substitute, the compositions themselves, and methods of their use.

The liquid product composition of the present invention also may find beneficial application as a molasses replacement in nutritive compositions and formulations, such as for animal feed applications. Accordingly, the present invention includes methods of producing nutritional supplements, compositions and foodstuffs using the liquid product composition of the present invention, the compositions themselves, and methods of their use.

The liquid product composition of the present invention also may be used as a liquid rumen microorganism stimulant in the same manner as described for a corresponding dry product, as described in U.S. Pat. No. 6,033,689, which is hereby incorporated herein by reference. Accordingly, the present invention includes methods of producing such a liquid rumen microorganism stimulant and methods of its use for stimulating the growth of microorganisms in a ruminant animal by administering to the ruminant animal an effective amount of a liquid composition according to claim 11.

The liquid product composition of the present invention also may be used as a pelleted feed improvement in which the NHWP acts as a binder in place of those as applied in accordance with known formulations and processes.

The liquid product composition of the present invention also may be applied as an agglomeration aid for fast dispersing dried milk replacement products in a wide variety of forms and for several applications, such as a natural dairy beverage additive in the form of agglomerated natural milk powder as described in U.S. Pat. No. 6,777,014, incorporated herein by reference. The invention thus includes a fast dispersing dried milk replacer product comprising an agglomeration aid comprising a liquid composition according to the present invention.

The liquid product composition of the present invention also may be used in a protein and carbohydrate encapsulated fat composition comprising an encapsulant component, wherein the encapsulant component encapsulant component comprising a liquid composition according to the present invention. The invention therefore includes a protein and carbohydrate encapsulated fat protein and carbohydrate encapsulated fat made using a liquid composition according to the present invention. Such compositions may be used as calf milk replacers, and the invention also includes a method of providing such nutrition to calves.

Although not limited to the theory of the invention, it is believed these improved properties are a result of the processing conditions used to enzymatically treat the whey permeate and concentrating the whey permeate condensate.

The methods of the present invention may be practiced using lactose as an alternative starting material as also described in co-pending patent application entitled NON-SETTLING GALACTOOLIGOSACCHARIDE-RICH LIQUID CONCENTRATE AND RELATED METHODS AND NUTRITIONAL COMPOSITIONS filed Mar. 22, 2010, hereby incorporated herein by reference.

BRIEF DESCRIPTION OF THE DRAWINGS

FIG. 8 is a table showing the measurements of chemical properties from HPLC data taken from whey permeate hydrolysate in accordance with one embodiment of the present invention.

FIG. 9 is a table showing the details of a process for producing a molasses substitute material in the form of whey permeate hydrolysate in accordance with one embodiment of the present invention.

FIG. 10 is a table showing a trial process for demonstrating the effect of hydrolysis on permeate solids in the production of whey permeate hydrolysate concentrates in accordance with one embodiment of the present invention.

FIG. 11 is a table showing the details of a process and experimental design for producing whey permeate hydrolysate concentrates in accordance with one embodiment of the present invention.

FIG. 12 is a table showing the data from several experiments for demonstrating the physical properties of whey permeate hydrolysate in accordance with one embodiment of the present invention, and includes a table showing a typical sugar test sample preparation from several experiments for demonstrating the chemical and physical properties of whey permeate hydrolysate in accordance with one embodiment of the present invention.

FIG. 13 is a table showing the data from several experiments involving varying enzyme concentrations, for demonstrating the physical properties of whey permeate hydrolysate in accordance with one embodiment of the present invention.

FIG. 17 is a table showing the data from several experiments involving varying reaction times and showing physical properties of whey permeate hydrolysate in accordance with one embodiment of the present invention.

FIG. 18 is a table showing the data from several experiments involving varying reaction times and showing physical properties of whey permeate hydrolysate in accordance with one embodiment of the present invention.

FIG. 19 is a table showing the data from several experiments involving varying reaction times and showing physical properties of whey permeate hydrolysate in accordance with one embodiment of the present invention.

FIG. 25 is a table showing a trial process for demonstrating the effect of hydrolysis on permeate solids in the production of whey permeate hydrolysate in accordance with one embodiment of the present invention.

FIG. 38 is a table showing the data from several experiments detailing the settling profile and showing physical properties of whey permeate hydrolysate concentrate in accordance with one embodiment of the present invention.

DETAILED DESCRIPTION OF THE PREFERRED EMBODIMENTS

In accordance with the foregoing summary of the invention, the following presents a detailed description of the preferred embodiments, which are considered to be the best mode thereof.

The preferred method and compositions described herein are not intended to be exhaustive or to limit the invention to the precise forms disclosed. They are chosen and described to explain the principles of the invention and the application of the method to practical uses so that others skilled in the art may practice the invention.

Example 1 of the Manufacturing Process of the Present Invention

Figure 1:
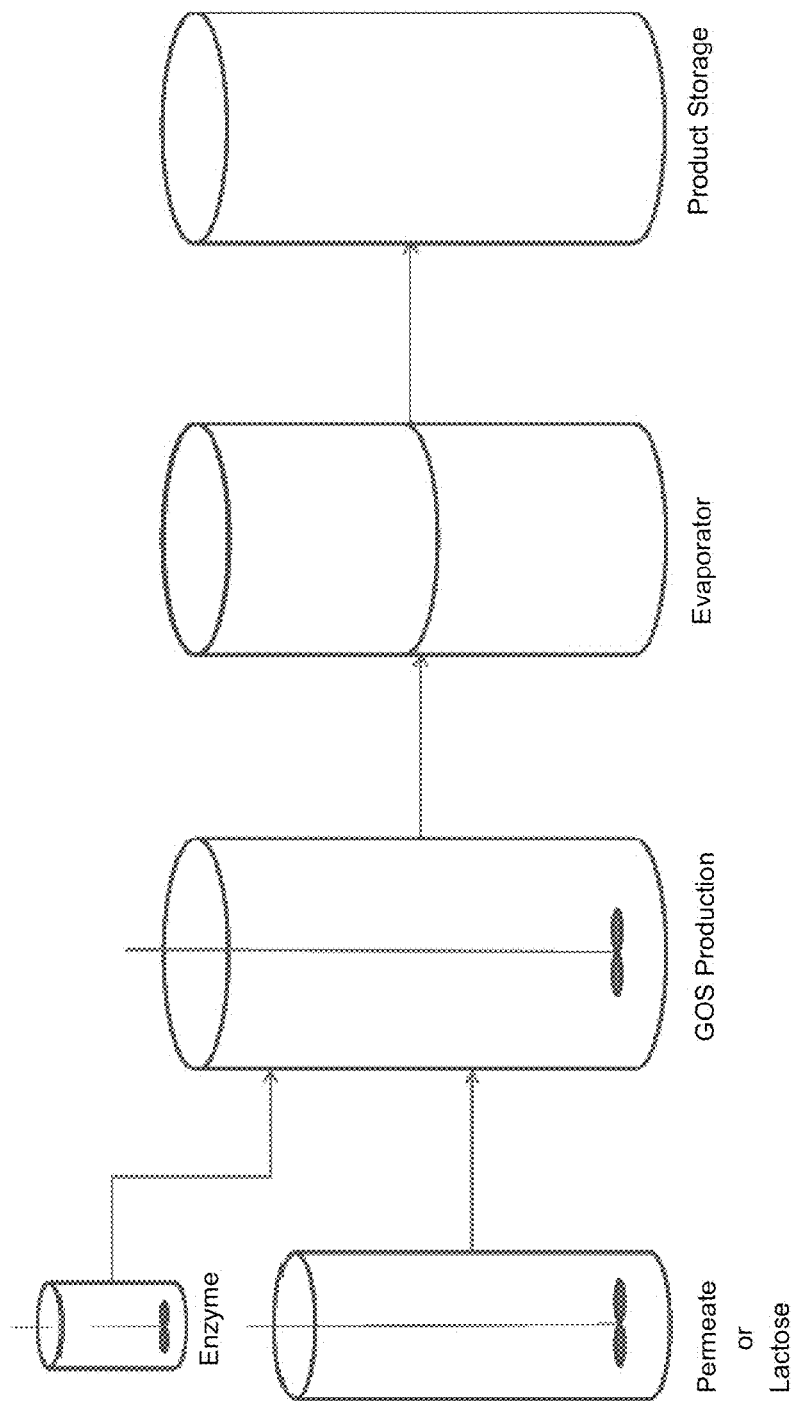
FIG. 1 is a schematic flow diagram of a reaction process in accordance with one embodiment of the present invention.

As a preferred but non-limiting example of the method by which compositions of the present invention may be made, the following steps may be followed:

FIG. 1 is a schematic flow diagram of a reaction process, and is representative of the process to manufacture a non-settling hydrolyzed whey permeate (NHWP) in accordance with one embodiment of the present invention.

The process steps for manufacture of NHWP include:
1. Add whey permeate or lactose to hydrolysis vessel (15-25% solids, preferably 18-20%)
2. Heat whey permeate or lactose solution to 70 to 80° C. (preferably 75° C.) for 15 to 45 min (preferably 30 min)
3. Cool to specified reaction temperature of enzyme used (different for different enzyme sources)
4. Hydrate enzyme in process water at reaction temperature in separate vessel and transfer to hydrolysis vessel to start hydrolysis
5. Carry out hydrolysis at optimal temperature (25 to 50° C.—preferably 35-40° C.) and pH optimal (5.0 to 7.5—preferably 6.5-7.0) for 3 to 24 hours (preferably 12 to 16 hours)
6. After hydrolysis has reached desired level transfer to evaporator and evaporate to 60 to 80% solids (preferably 75-80% solids)
7. When desired level of solids is reached transfer to product storage vessel Detailed lab and plant protocols along with HPLC sugar profiles are attached as the Figures hereto.

As can be appreciated from FIG. 1, this schematic shows a flow diagram of a reaction process in accordance with one embodiment of the present invention. The whey permeate is preferably held in a holding tank with available stirring as shown. Likewise, the enzyme, such as Novo® Lactase (commercially available from Novozymes of Bagsvaerd, Denmark) or Validase® (commercially available from Valley Research of South Bend, Ind.), is held in a holding tank with available stirring. The whey permeate and enzyme are conducted to a hydrolysis reaction tank where hydrolysis takes place under the above described conditions. The resultant hydrolysate is then conducted to an evaporator where it is concentrated to the solids level described herein. The resultant hydrolysate concentrate may then be further conducted to a product storage tank or through conduits for further processing or packaging as required by the desired application.

Figure 2:
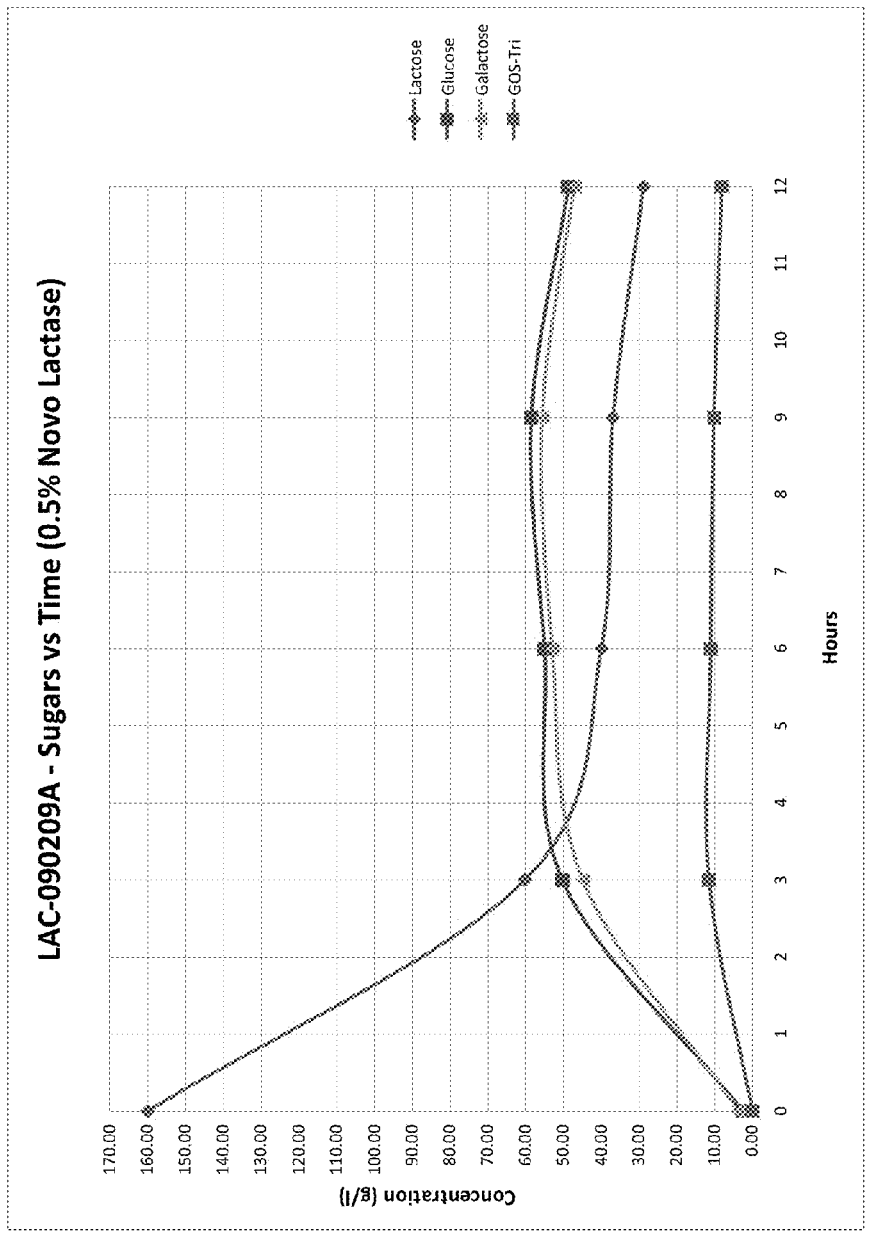
FIG. 2 is a graph of sugars versus reaction time showing a typical reaction profile for the production of whey permeate hydrolysate in accordance with one embodiment of the present invention.
Figure 3:
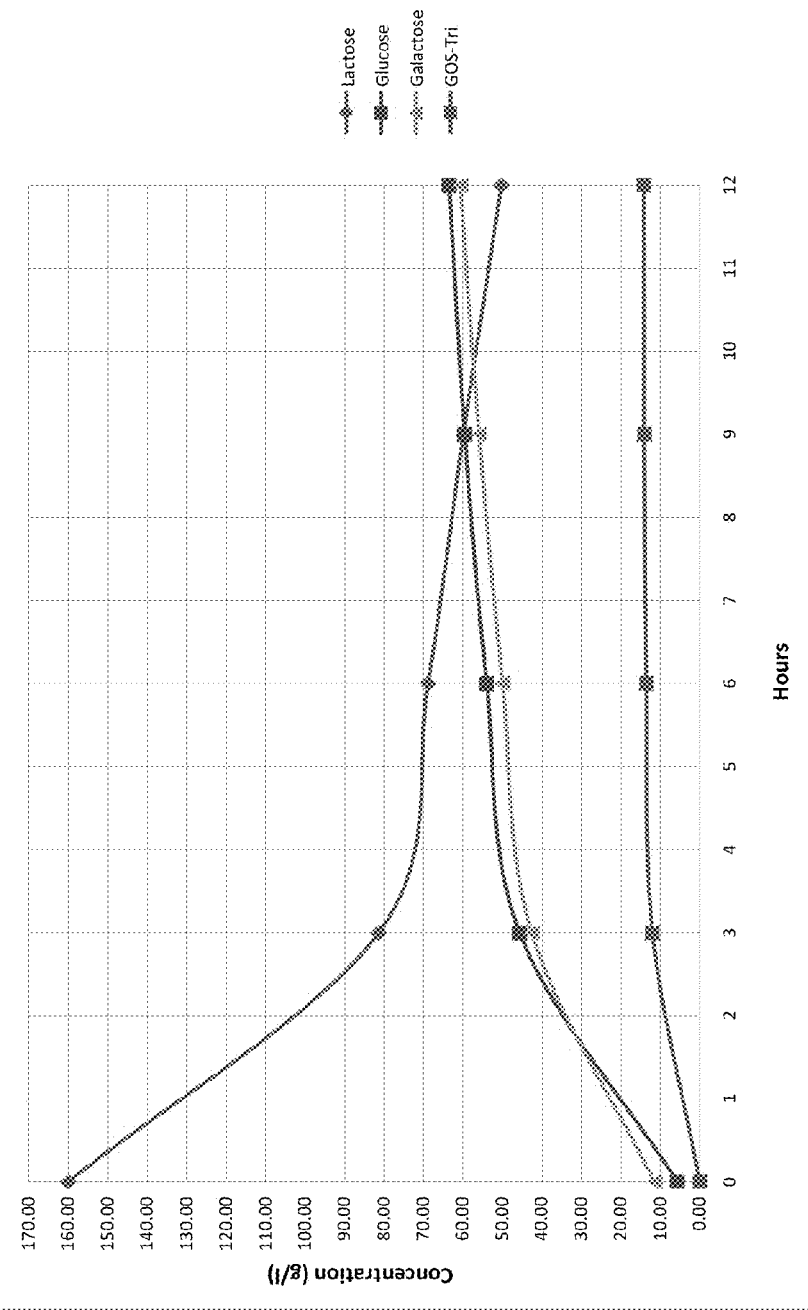
FIG. 3 is a graph of sugars versus reaction time showing a typical reaction profile for the production of whey permeate hydrolysate in accordance with one embodiment of the present invention.
Figure 4:
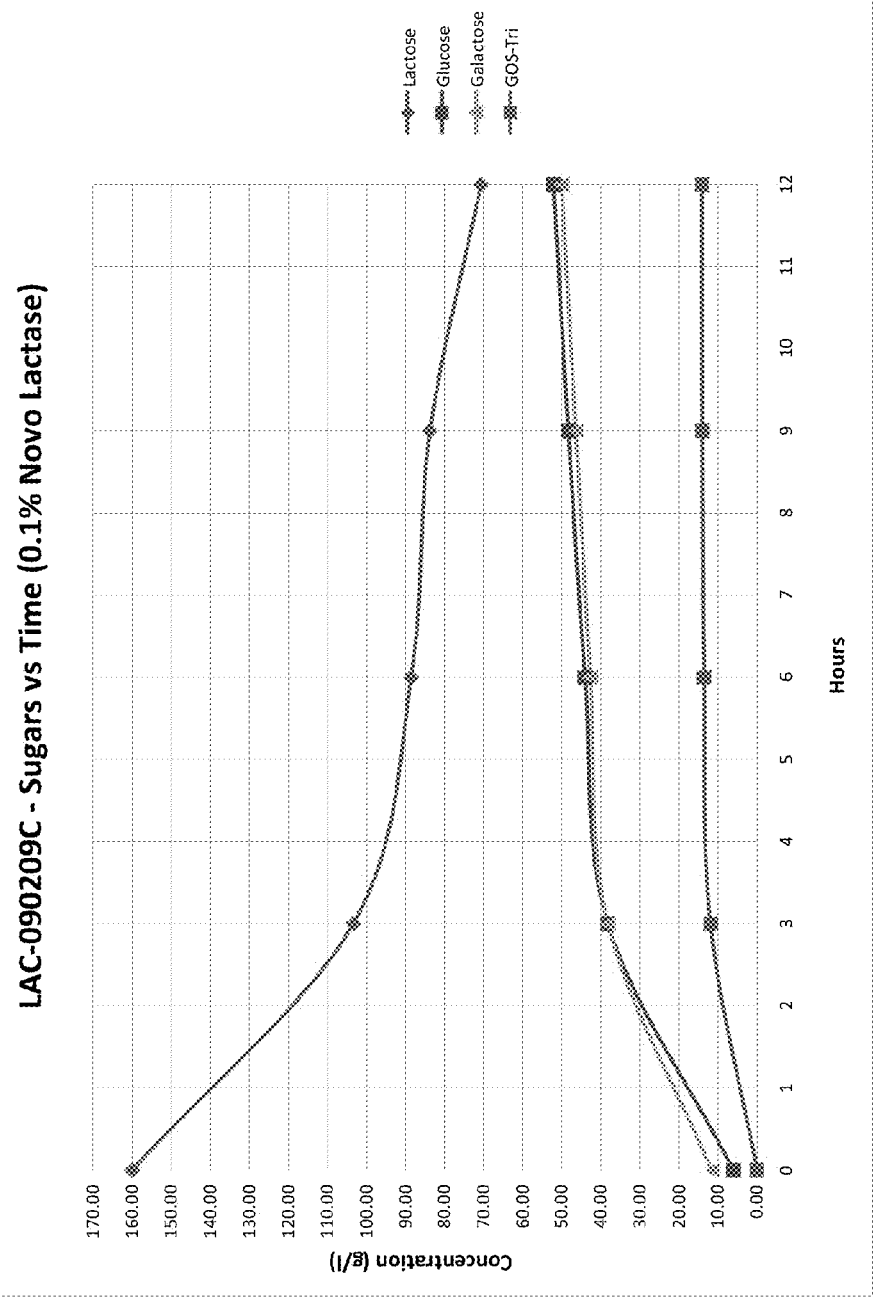
FIG. 4 is a graph of sugars versus reaction time showing a typical reaction profile for the production of whey permeate hydrolysate in accordance with one embodiment of the present invention.

FIGS. 2-4 are graphs of sugars versus reaction time showing a typical reaction profile for the production of whey permeate hydrolysate in accordance with one embodiment of the present invention, showing the results for various respective Novo Lactase concentrations.

Figure 5:
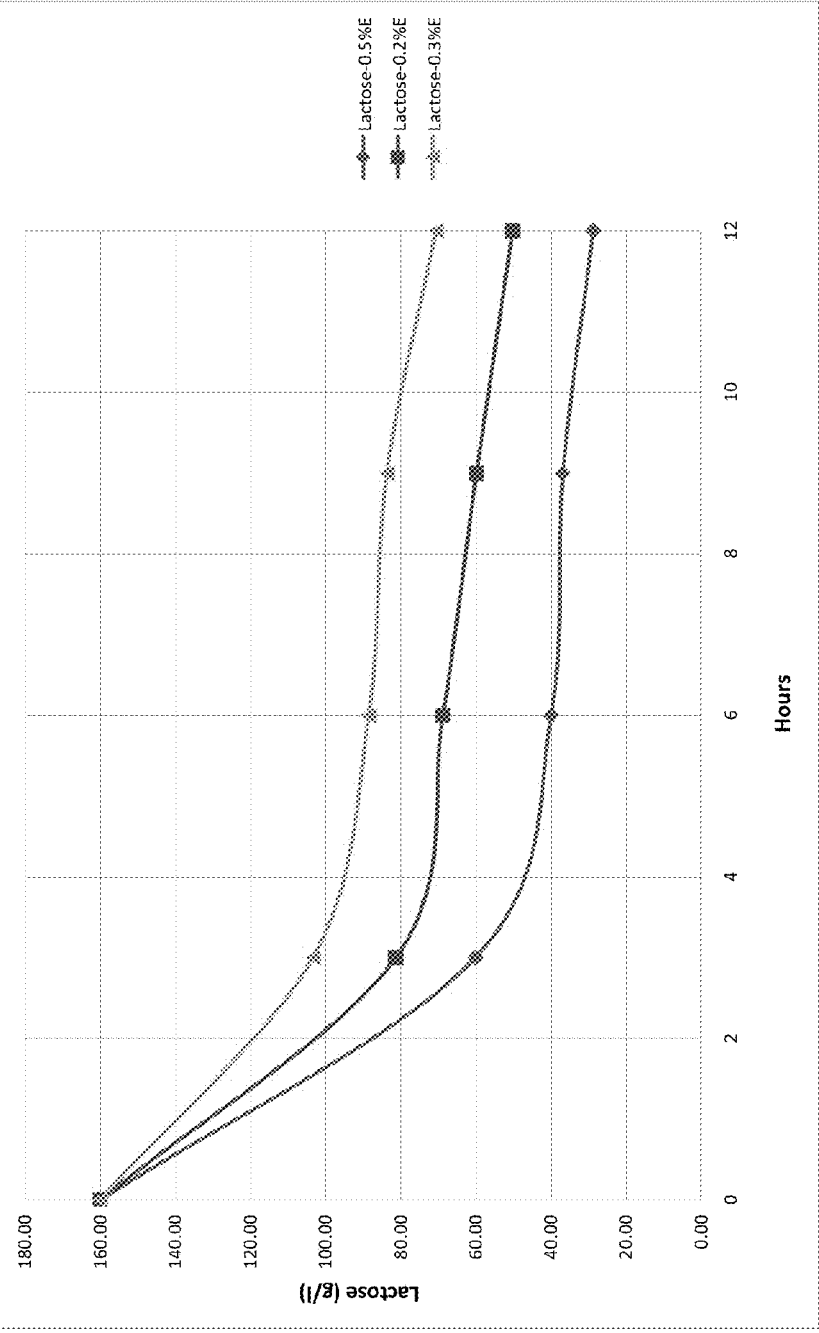
FIG. 5 is a graph of lactose versus reaction time showing a typical reaction profile for the production of whey permeate hydrolysate in accordance with one embodiment of the present invention.

FIG. 5 is a graph of lactose versus reaction time showing a typical reaction profile for the production of whey permeate hydrolysate in accordance with one embodiment of the present invention, showing the results for various respective Novo Lactase concentrations.

Figure 6:
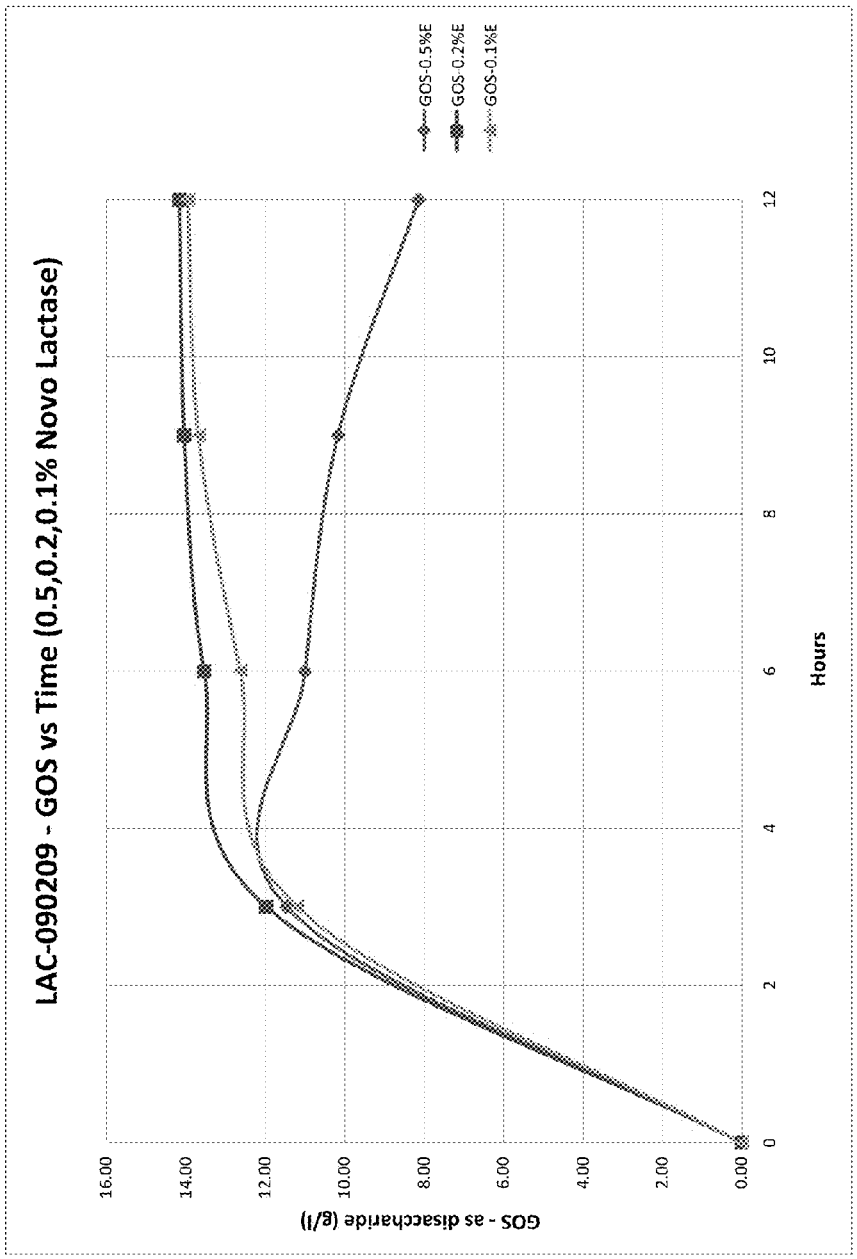
FIG. 6 is a graph of galactooligosaccharides (GOS) versus reaction time showing a typical reaction profile for the production of whey permeate hydrolysate in accordance with one embodiment of the present invention.

FIG. 6 is a graph of galactooligosaccharides (GOS) versus reaction time showing a typical reaction profile for the production of whey permeate hydrolysate in accordance with one embodiment of the present invention, showing the results for various respective Novo Lactase concentrations.

Figure 7:
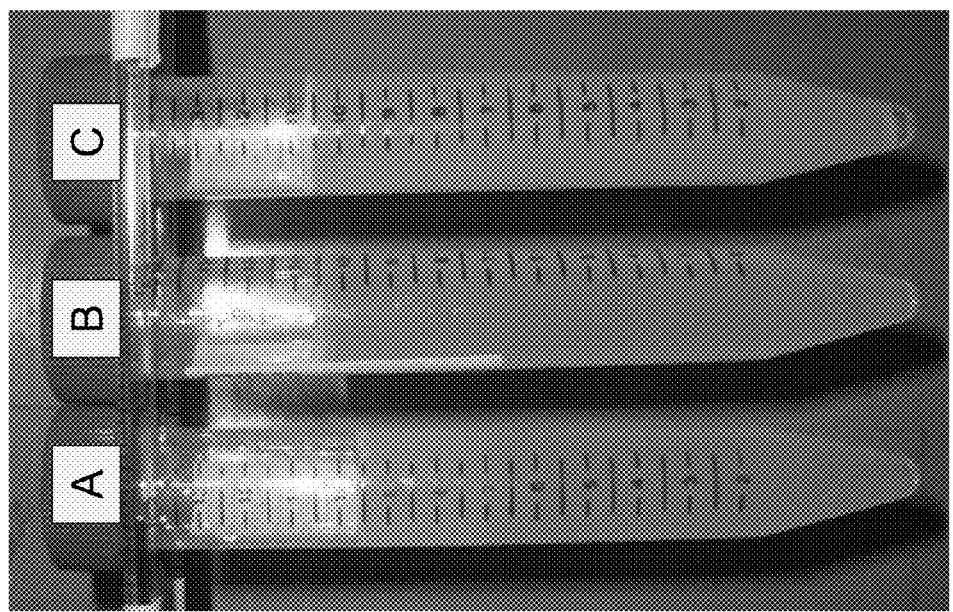
FIG. 7 is a photograph showing the physical properties of whey permeate hydrolysate in accordance with one embodiment of the present invention.

FIG. 7 is a photograph showing the physical properties of whey permeate hydrolysate in accordance with one embodiment of the present invention, having 80% solids and after 12 hours hydrolysis at pH 6.5 with various respective Novo Lactase concentrations.

FIG. 8 is a table showing the measurements of chemical properties from HPLC data taken from whey permeate hydrolysate in the processes described herein.

FIG. 9 is a table showing the details of a process for producing a molasses substitute material in the form of whey permeate hydrolysate concentrate as described herein.

Figure 10:
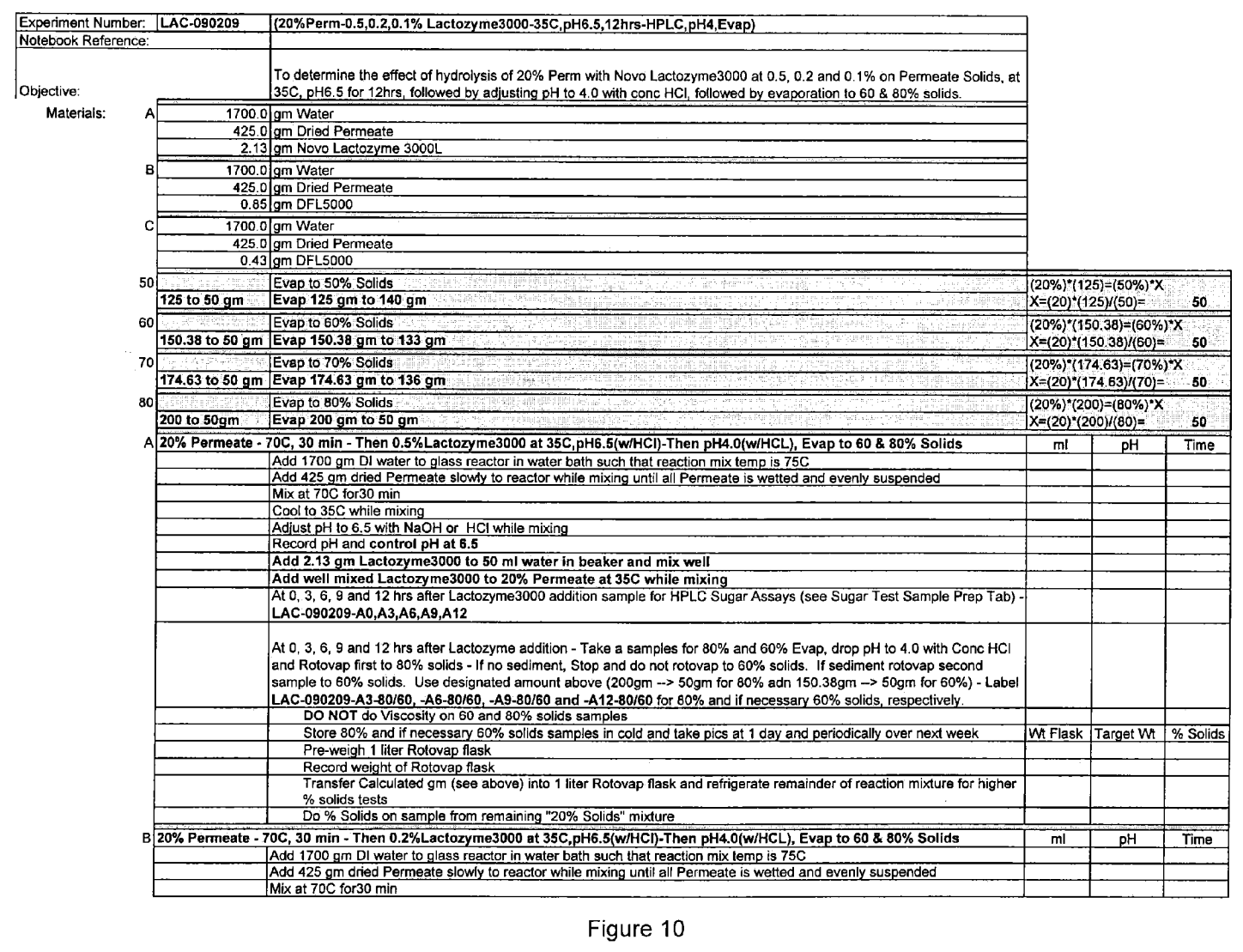

FIG. 10 is a table showing a trial process for demonstrating the effect of hydrolysis on permeate solids in the production of whey permeate hydrolysate concentrates in accordance with one embodiment of the present invention.

Figure 11:
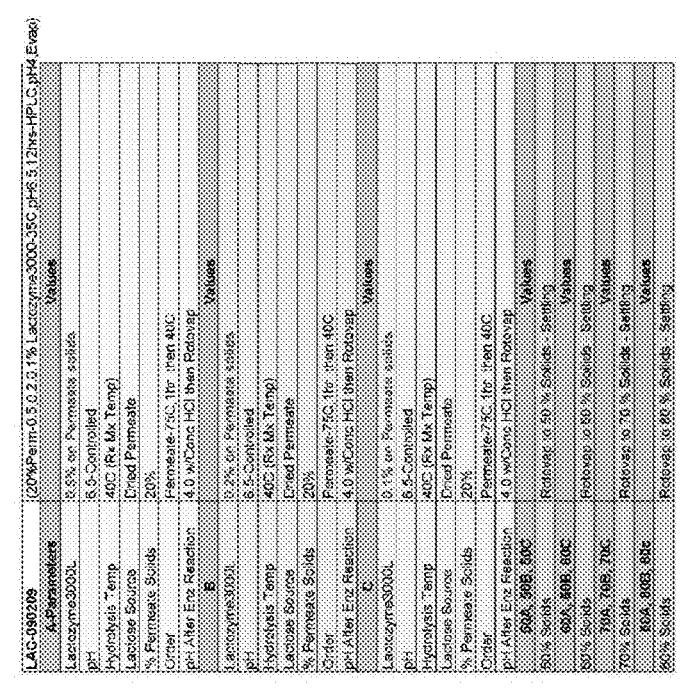

FIG. 11 is a table showing the details of a process and experimental design for producing whey permeate hydrolysate in accordance with one embodiment of the present invention.

Figure 12:
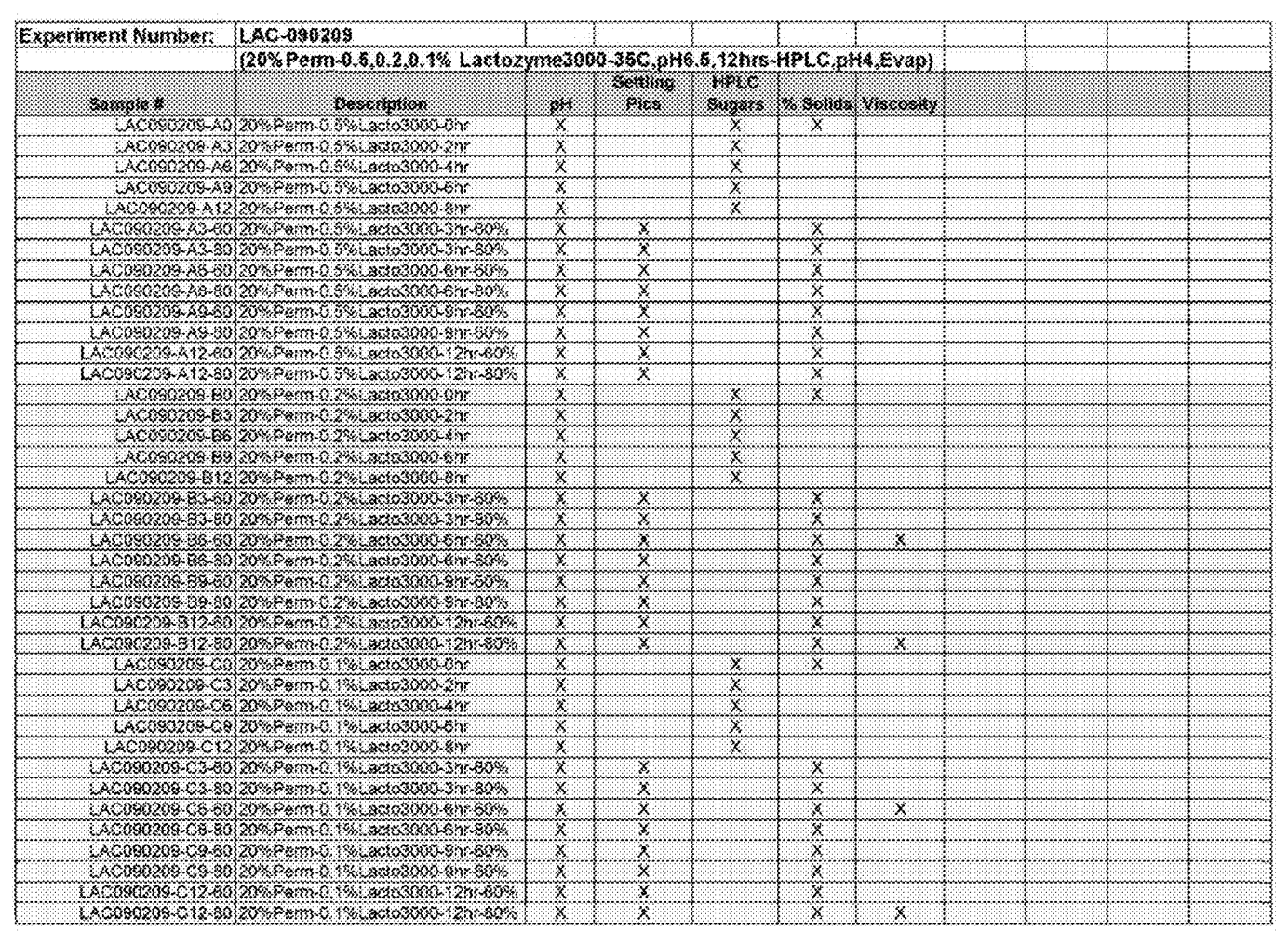

FIG. 12 is a table showing the data from several experiments for demonstrating the physical properties of whey permeate hydrolysate in accordance with one embodiment of the present invention, and includes a table showing a typical sugar test sample preparation from several experiments for demonstrating the chemical and physical properties of whey permeate hydrolysate in accordance with one embodiment of the present invention.

FIG. 13 is a table showing the data from several experiments involving varying enzyme concentrations, for demonstrating the physical properties of whey permeate hydrolysate in accordance with one embodiment of the present invention.

Figure 14:
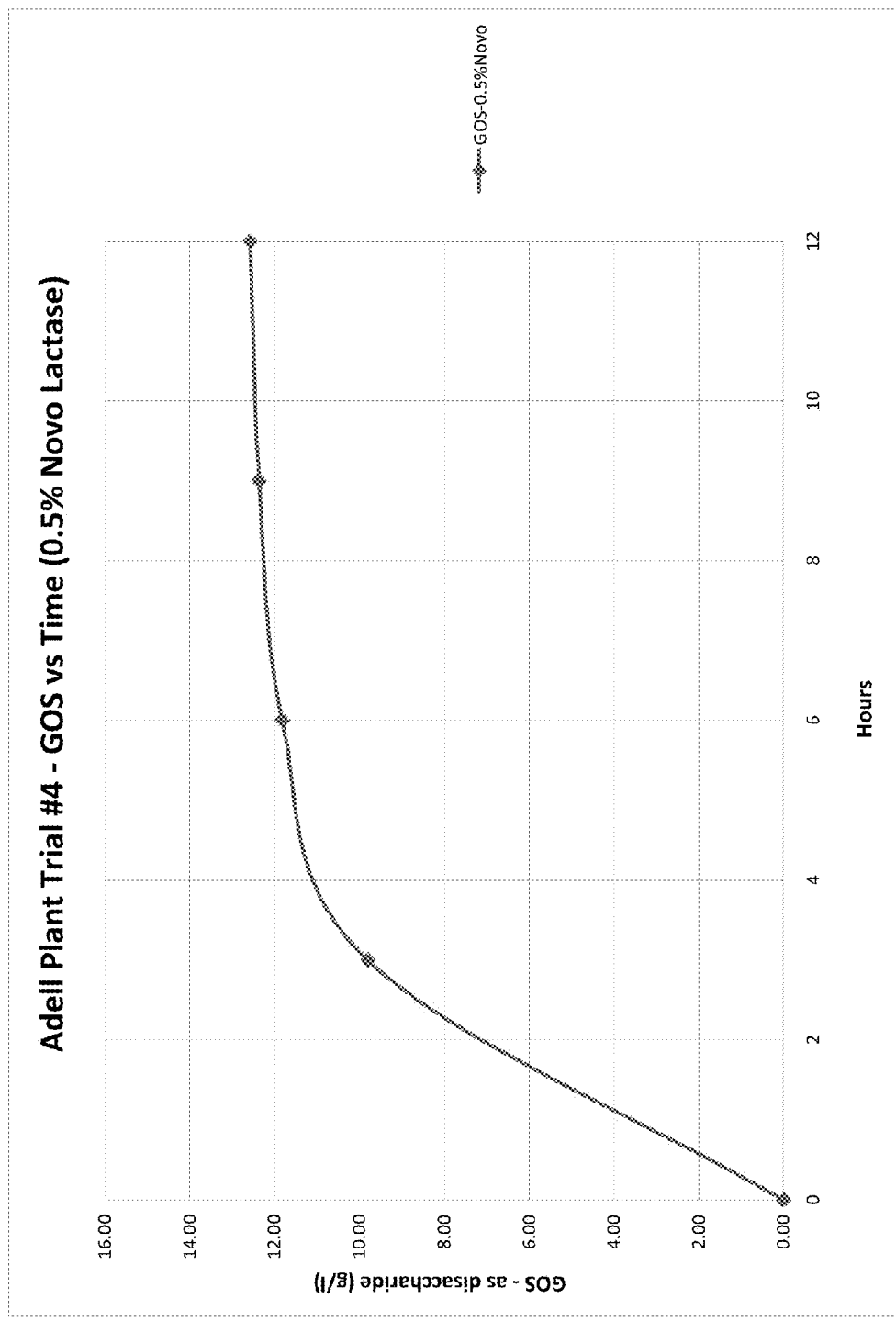
FIG. 14 is a graph of sugars versus reaction time showing a typical reaction profile for the production of whey permeate hydrolysate in accordance with one embodiment of the present invention.
Figure 15:
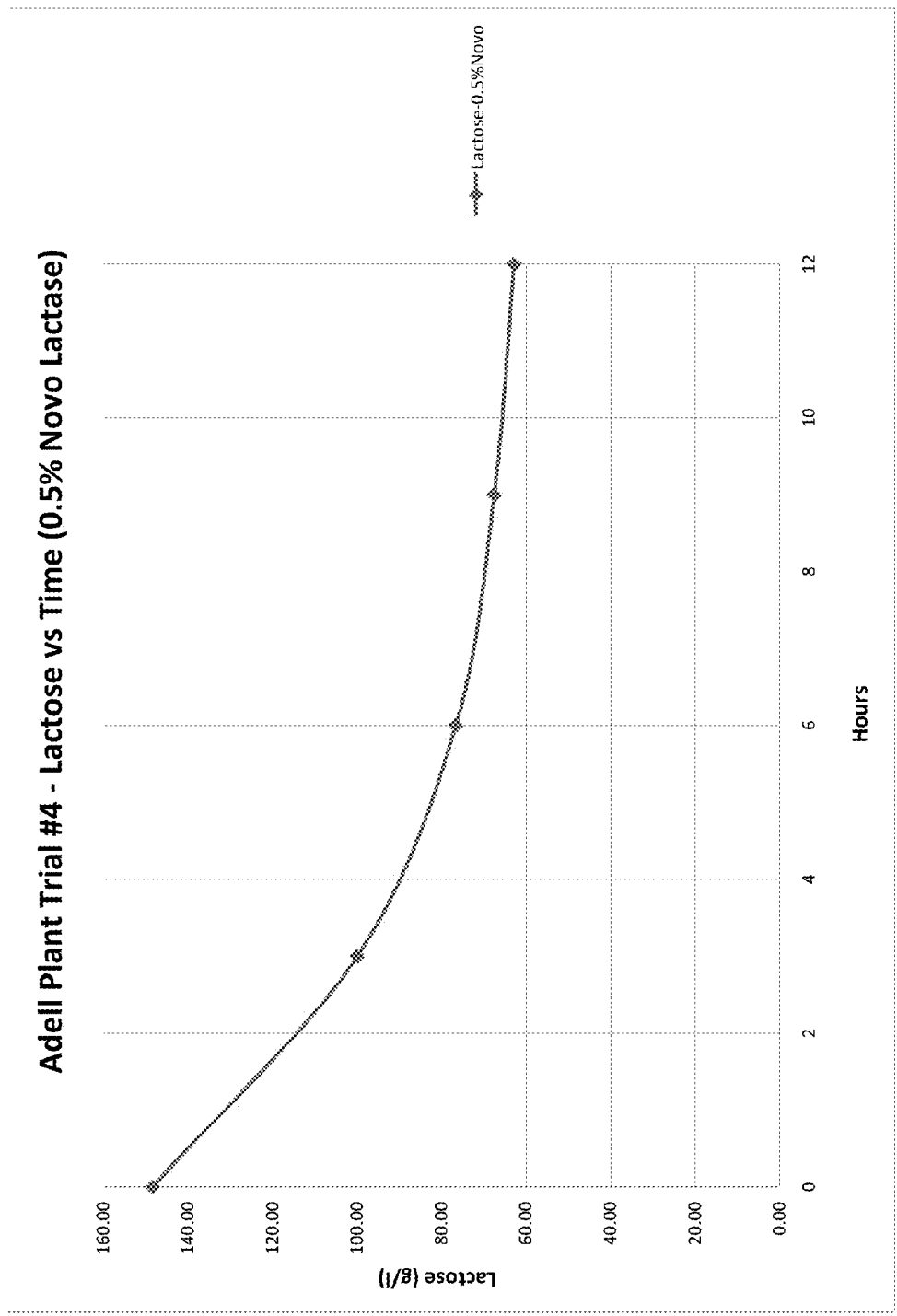
FIG. 15 is a graph of sugars versus reaction time showing a typical reaction profile for the production of whey permeate hydrolysate in accordance with one embodiment of the present invention.
Figure 16:
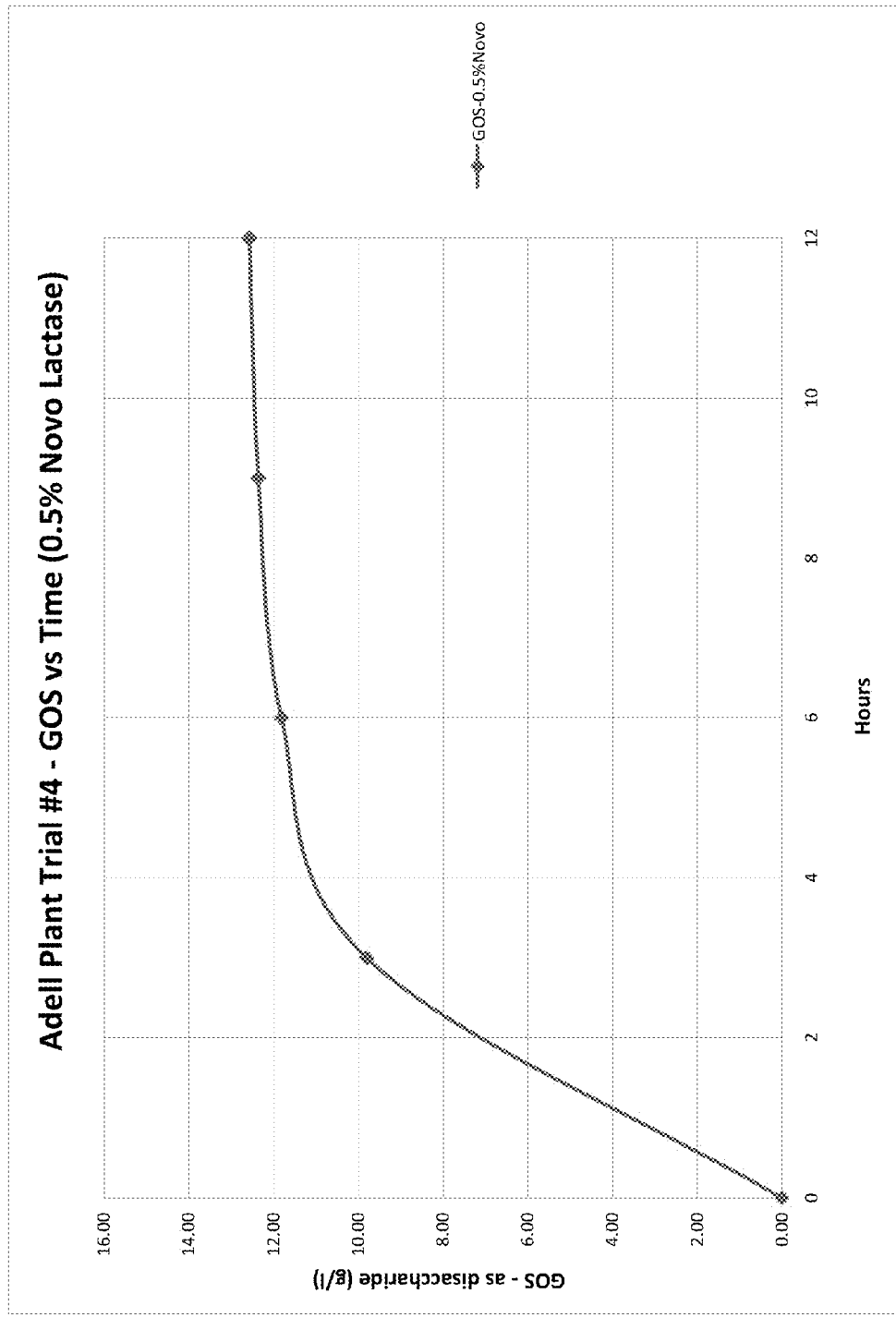
FIG. 16 is a graph of sugars versus reaction time showing a typical reaction profile for the production of whey permeate hydrolysate in accordance with one embodiment of the present invention.

FIGS. 14, 15 and 16 are graphs of sugars versus reaction time showing a typical reaction profile for the production of whey permeate hydrolysate in accordance with several embodiments of the present invention. These graphs elucidate the properties that give rise to the preferred embodiment of the invention.

Figure 17:
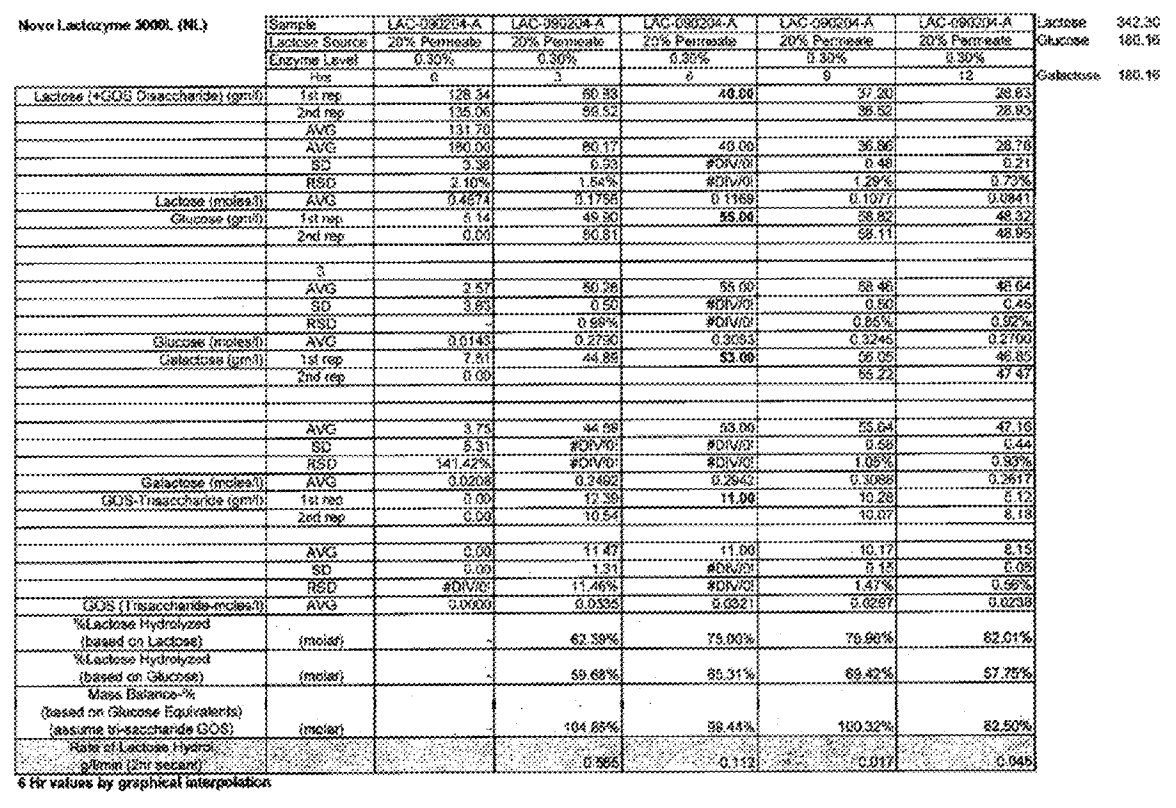
Figure 18:
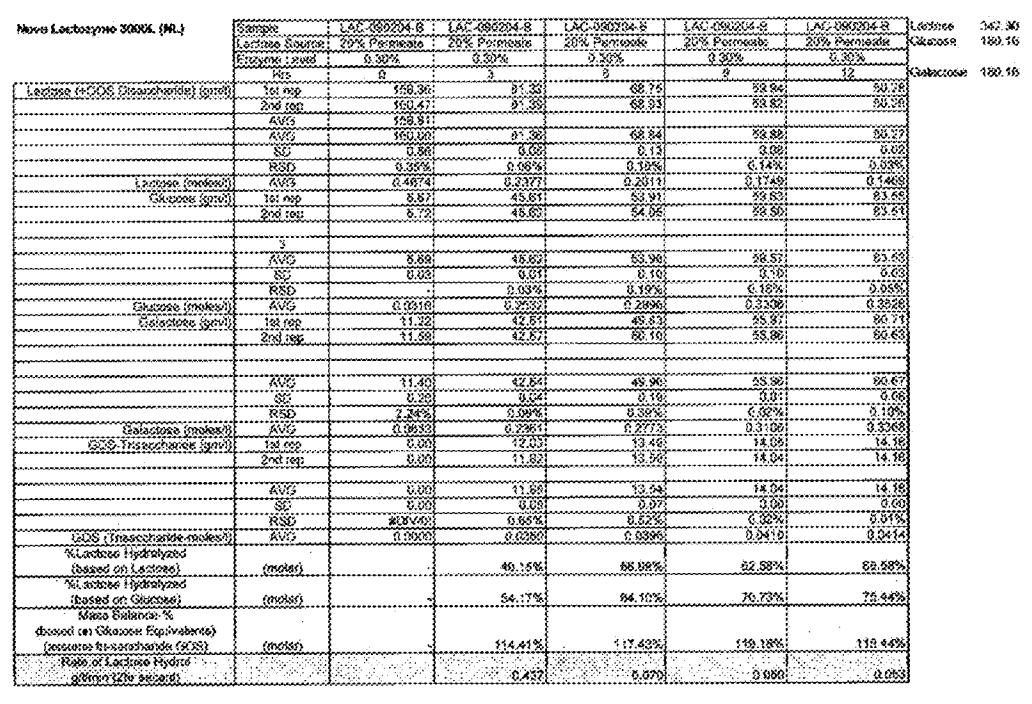
Figure 19:
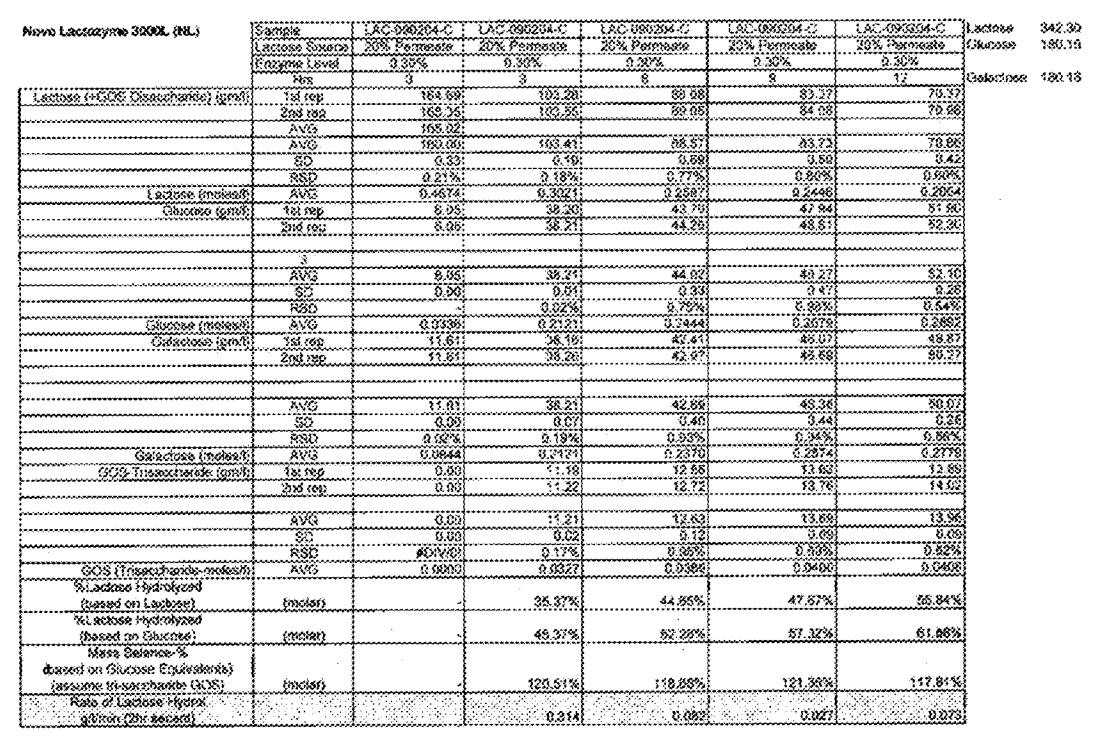

FIGS. 17, 18 and 19 are tables showing the data from several experiments involving varying reaction times and showing physical properties of whey permeate hydrolysate in accordance with several embodiments of the present invention, and serves to show the variations in the preparation of whey permeate hydrolysate in accordance with the invention.

Figure 20:
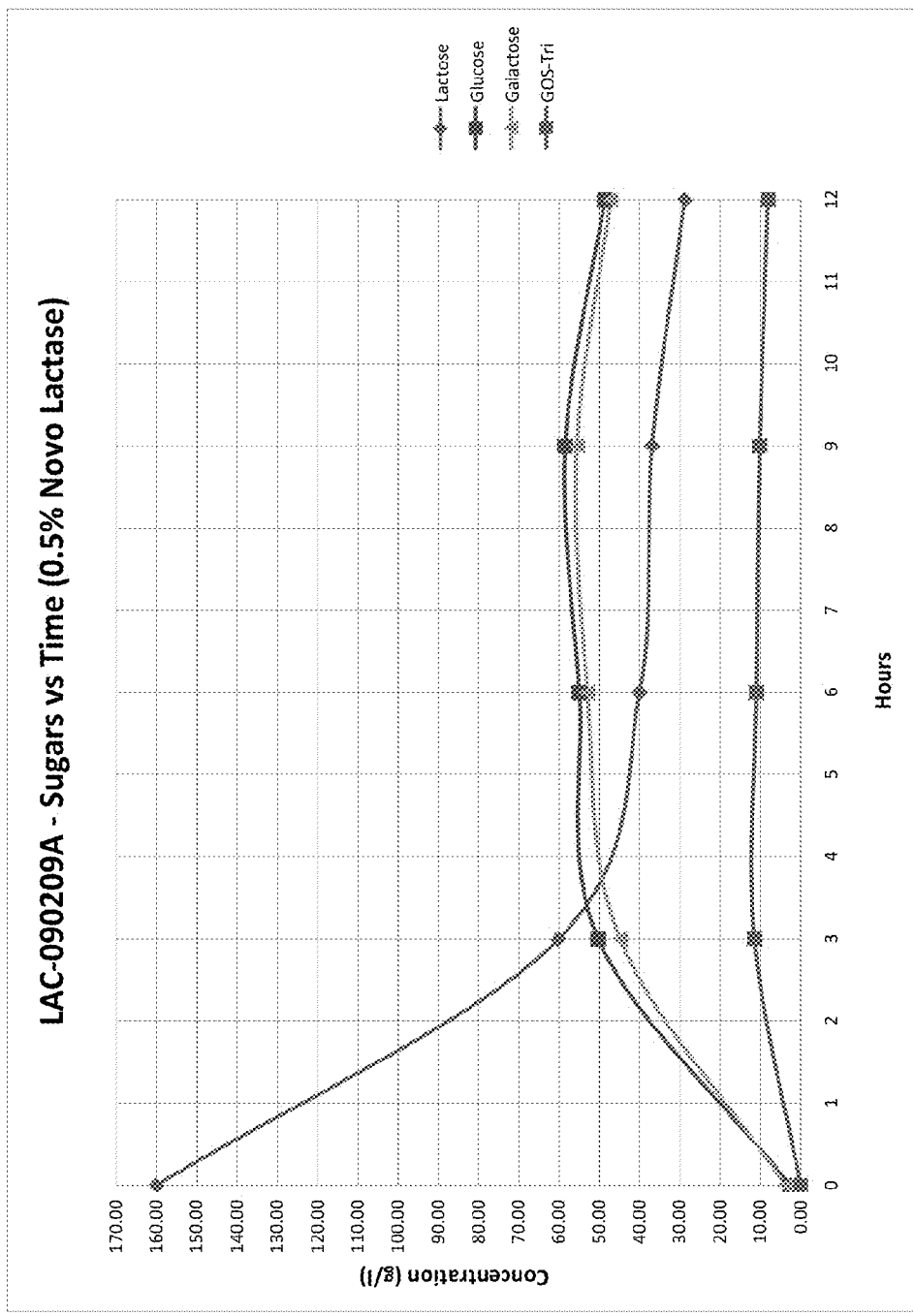
FIG. 20 is a graph of sugars versus reaction time showing a typical reaction profile for the production of whey permeate hydrolysate in accordance with one embodiment of the present invention.
Figure 21:
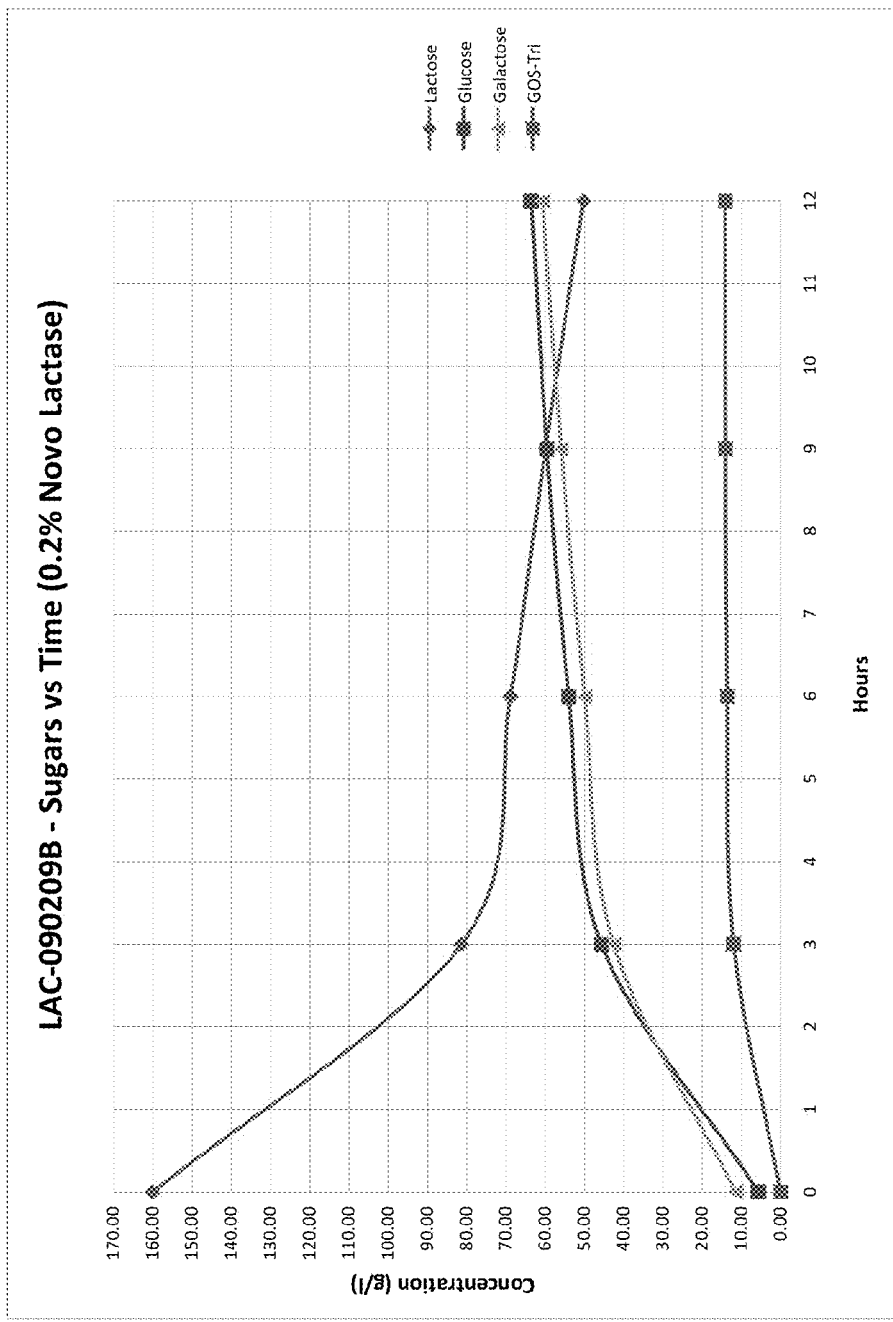
FIG. 21 is a graph of sugars versus reaction time showing a typical reaction profile for the production of whey permeate hydrolysate in accordance with one embodiment of the present invention.
Figure 22:
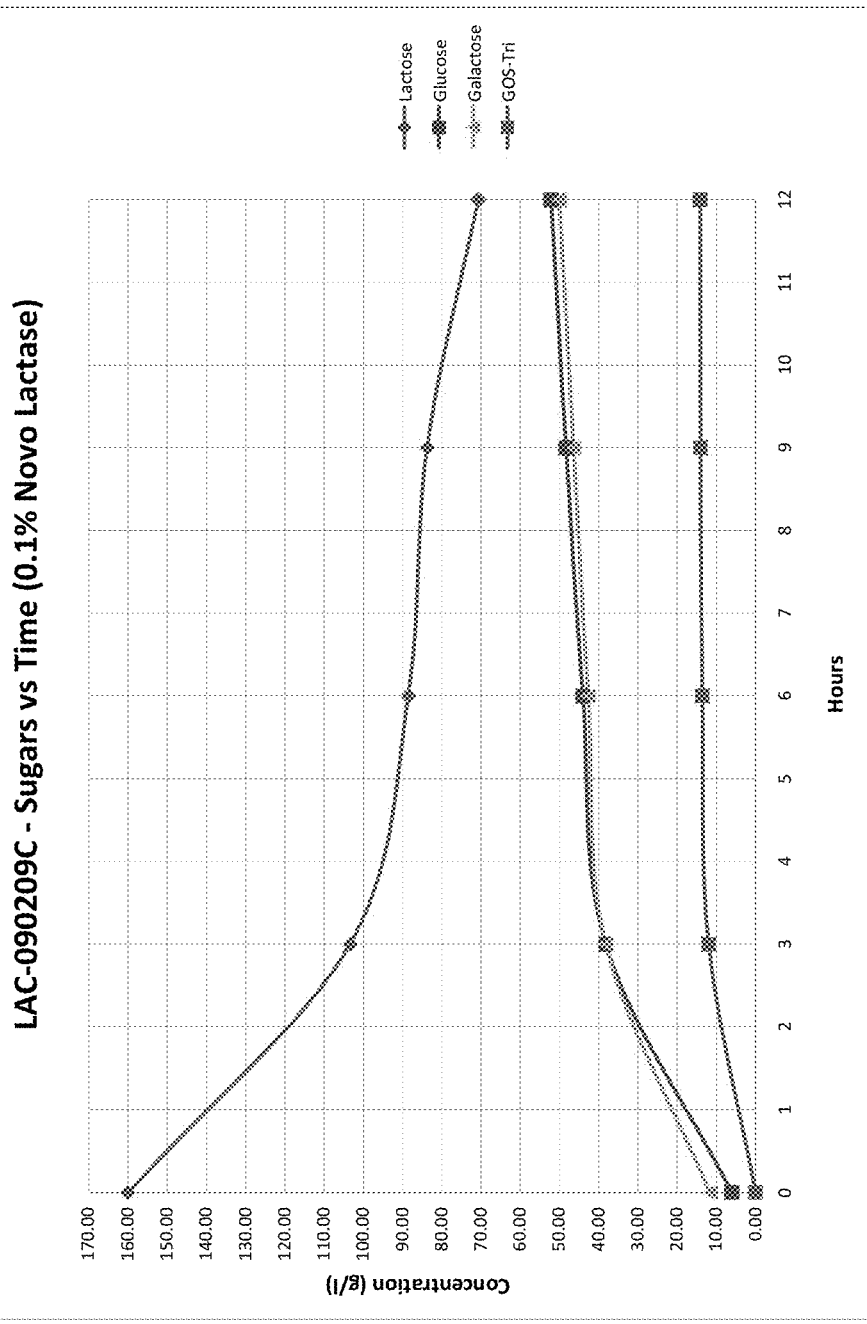
FIG. 22 is a graph of sugars versus reaction time showing a typical reaction profile for the production of whey permeate hydrolysate in accordance with one embodiment of the present invention.

FIGS. 20, 21 and 22 are graphs of sugars versus reaction time showing a typical reaction profile for the production of whey permeate hydrolysate with differing enzyme concentrations, in accordance with several embodiments of the present invention.

Figure 23:
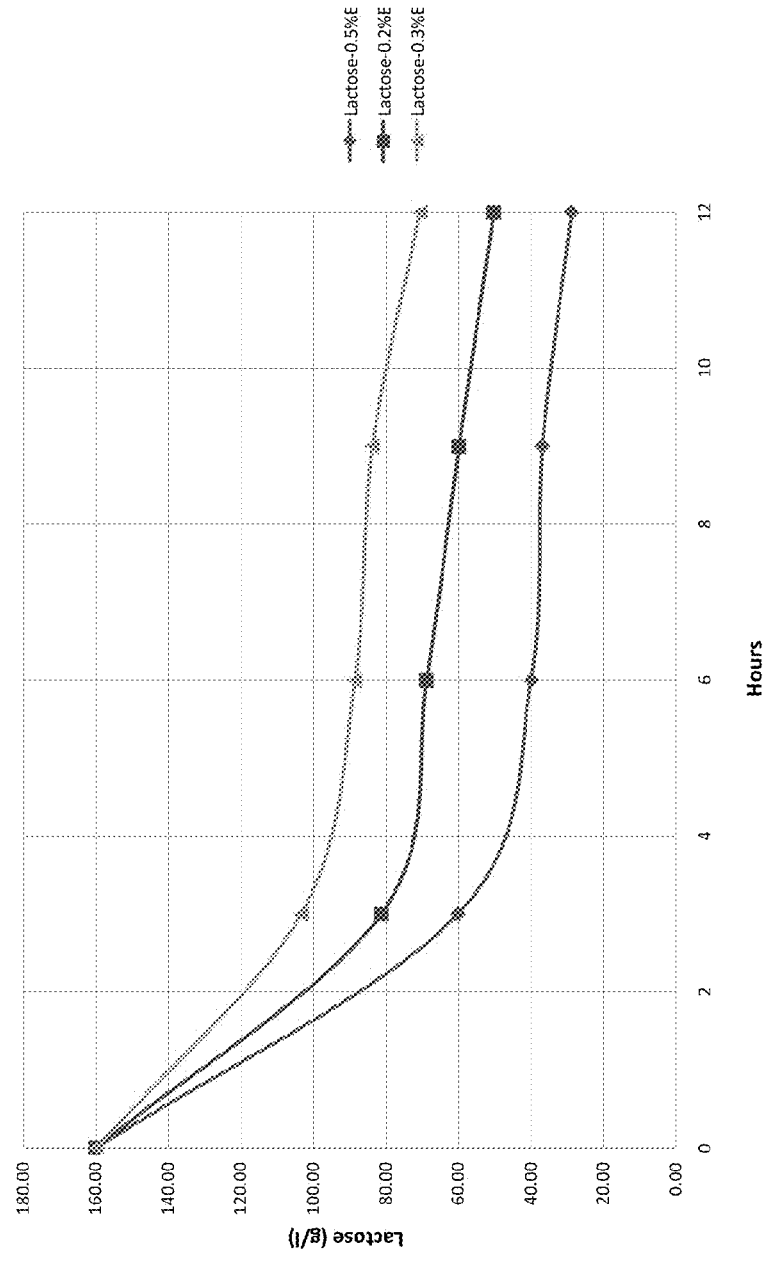
FIG. 23 is a graph of lactose versus reaction time showing a typical reaction profile for the production of whey permeate hydrolysate in accordance with one embodiment of the present invention.

FIG. 23 is a graph of lactose versus reaction time showing a typical reaction profile for the production of whey permeate hydrolysate in accordance with several embodiments of the present invention.

Figure 24:
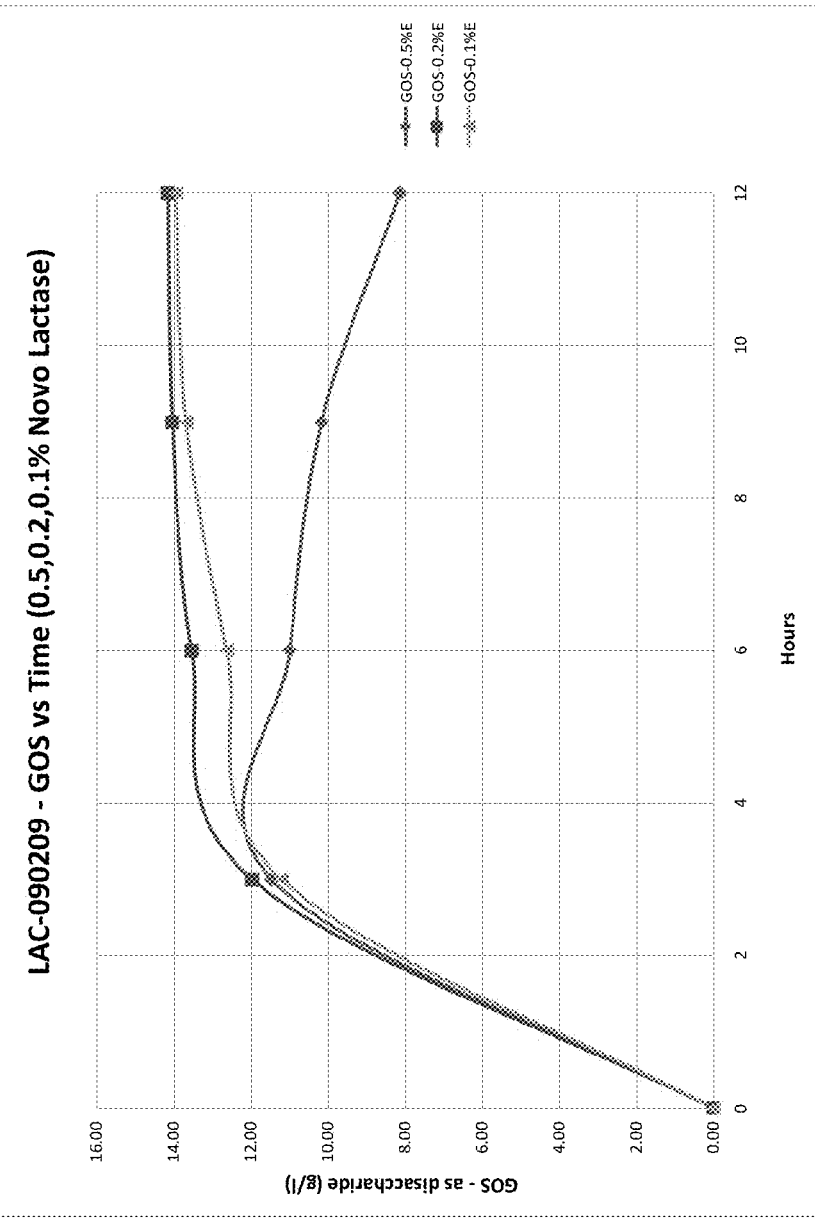
FIG. 24 is a graph of GOS versus reaction time showing a typical reaction profile for the production of whey permeate hydrolysate in accordance with one embodiment of the present invention.

FIG. 24 is a graph of GOS versus reaction time showing a typical reaction profile for the production of whey permeate hydrolysate in accordance several embodiments of the present invention.

Figure 25:
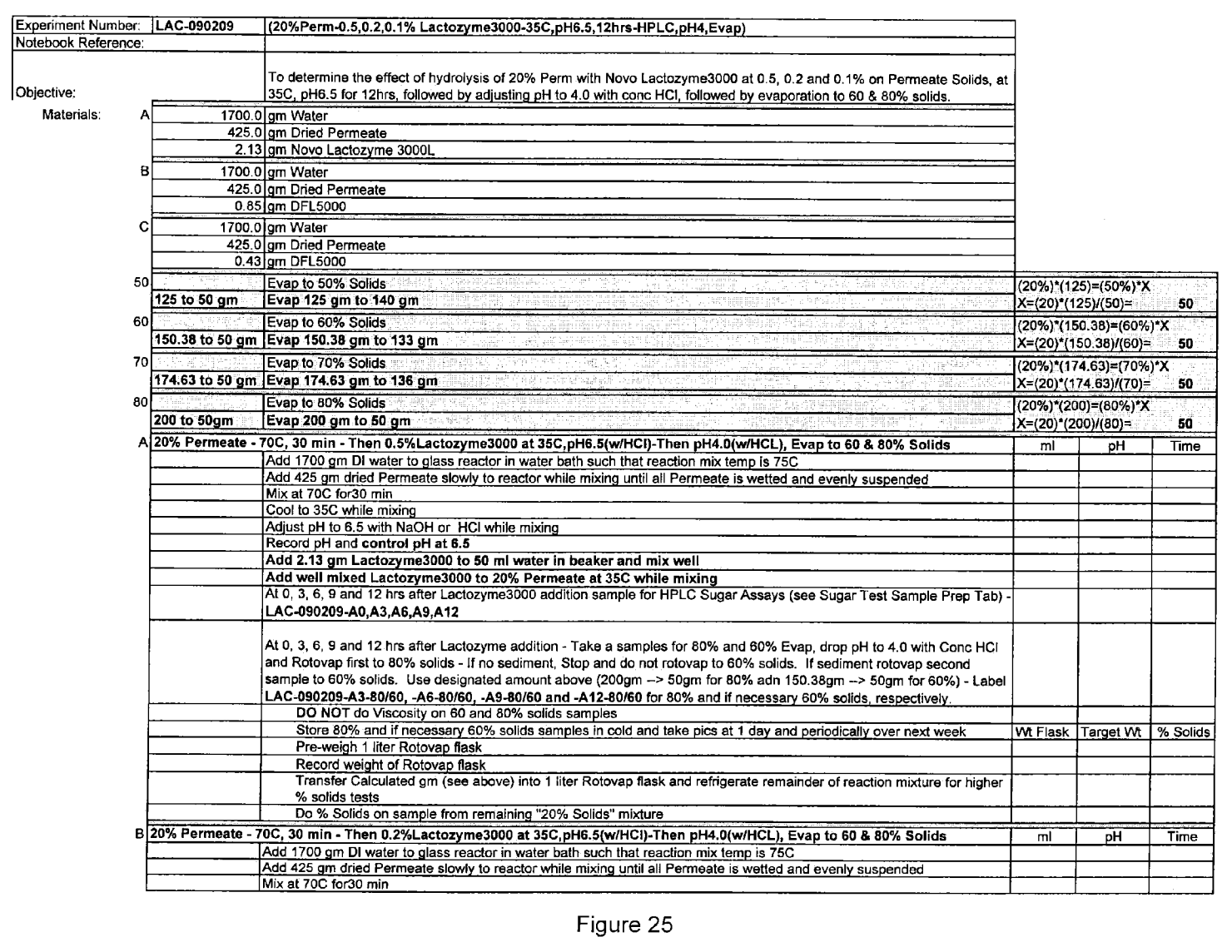

FIG. 25 is a table showing a trial process for demonstrating the effect of hydrolysis on permeate solids in the production of whey permeate hydrolysate in accordance with several embodiments of the present invention.

Figure 26:
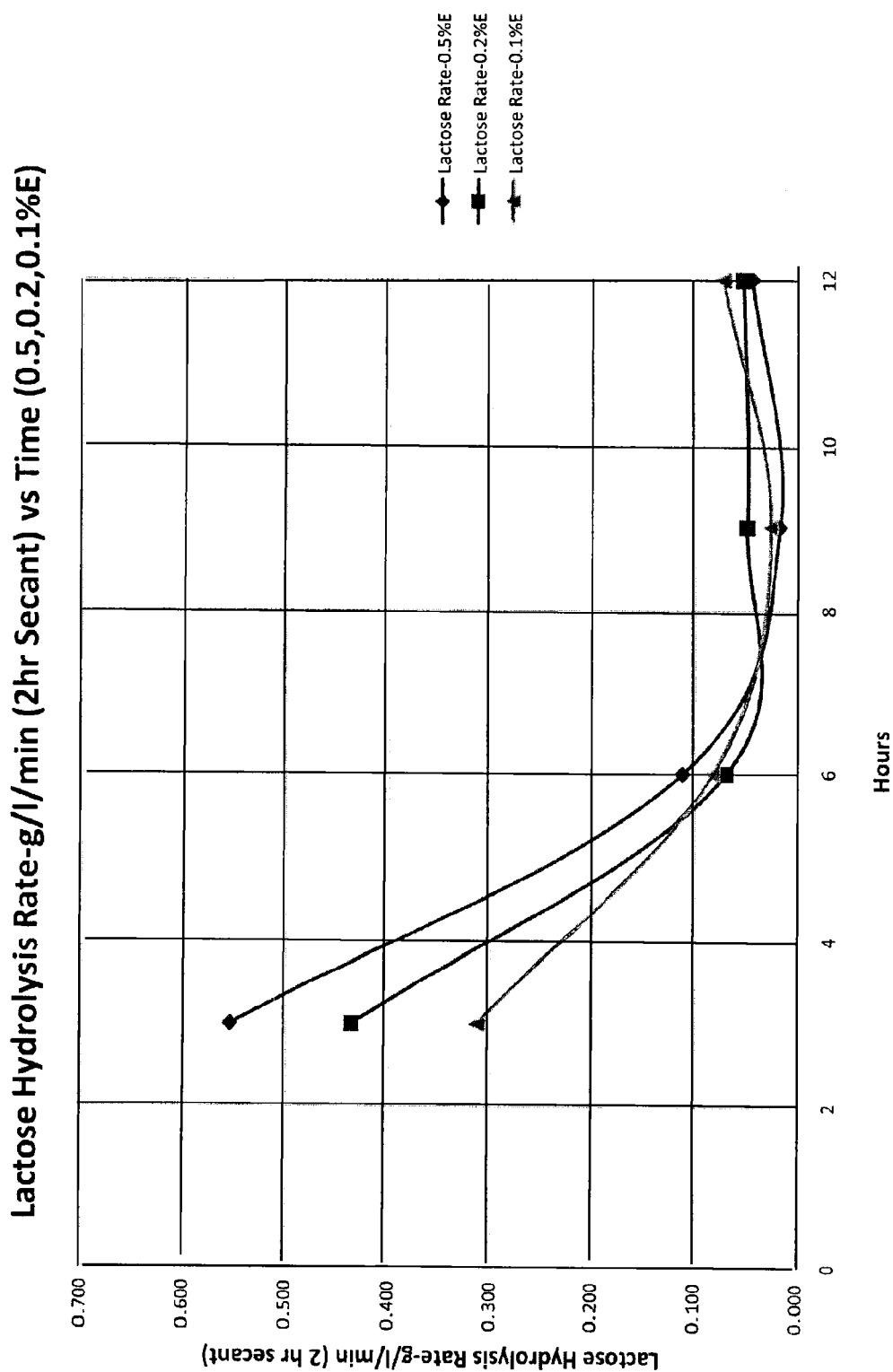
FIG. 26 is a graph of lactose hydrolysis versus time for various enzyme concentrations for the production of whey permeate hydrolysate in accordance with one embodiment of the present invention.
Figure 27:
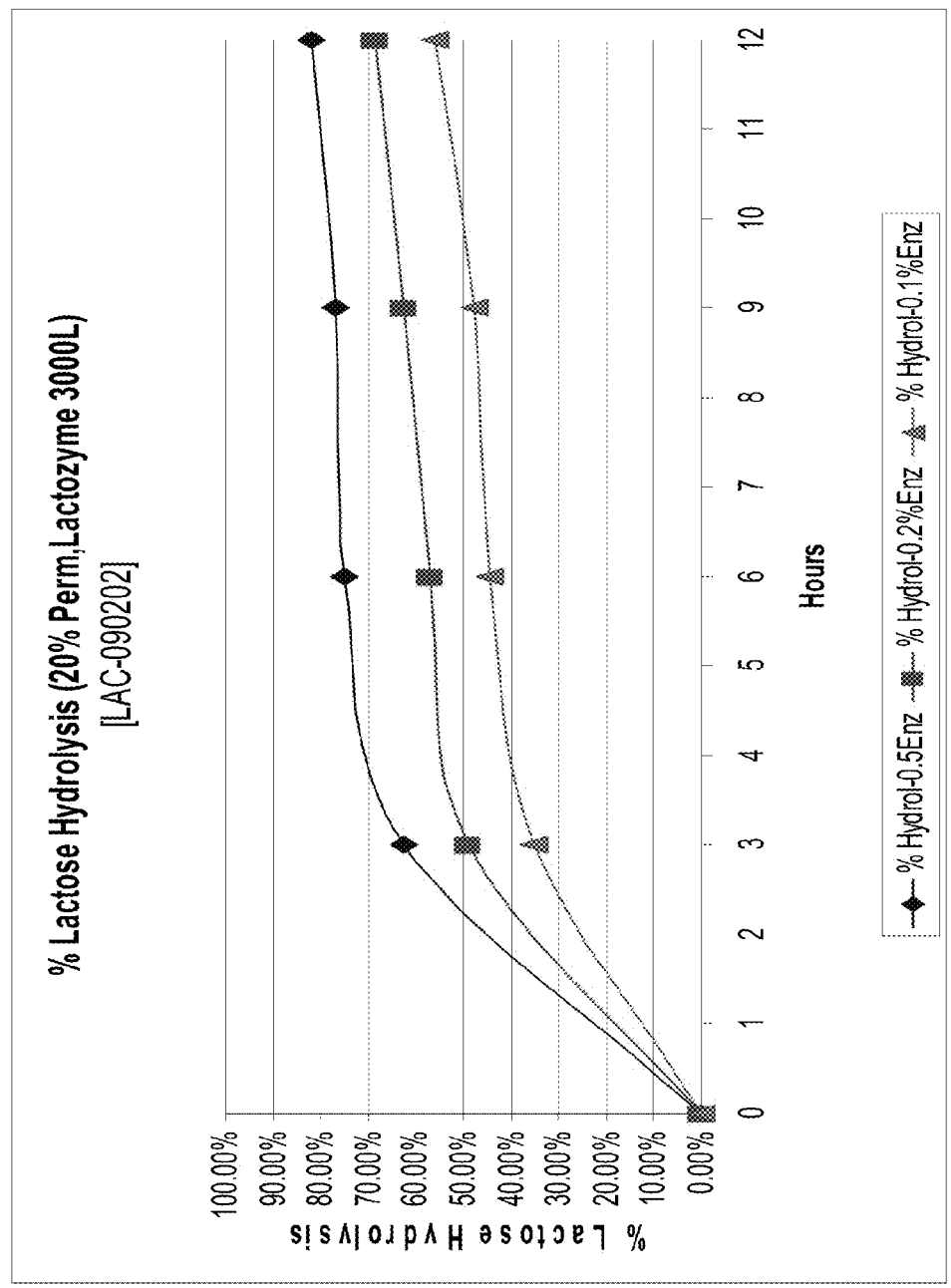
FIG. 27 is a graph of percent lactose hydrolysis versus time for various enzyme concentrations for the production of whey permeate hydrolysate in accordance with one embodiment of the present invention.

FIGS. 26 and 27 are graphs of lactose hydrolysis versus time for various enzyme concentrations for the production of whey permeate hydrolysate in accordance with several embodiments of the present invention.

Figure 28:
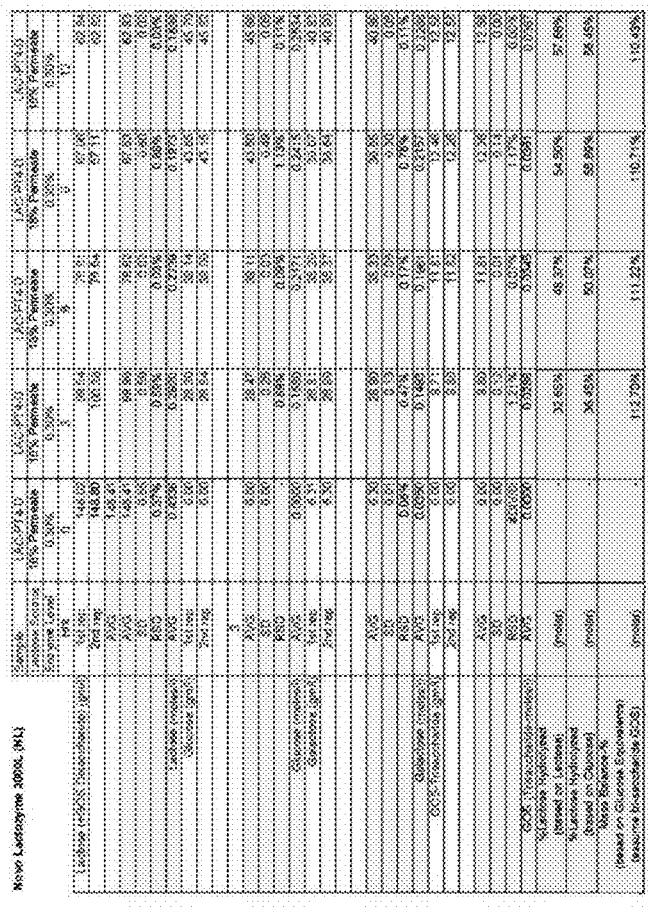
FIG. 28 is a table showing the data from several experiments involving varying reaction times and showing physical properties of whey permeate hydrolysate in accordance with one embodiment of the present invention.

FIG. 28 is a table showing the data from several experiments involving varying reaction times and showing physical properties of whey permeate hydrolysate in accordance with one embodiment of the present invention.

Figure 29:
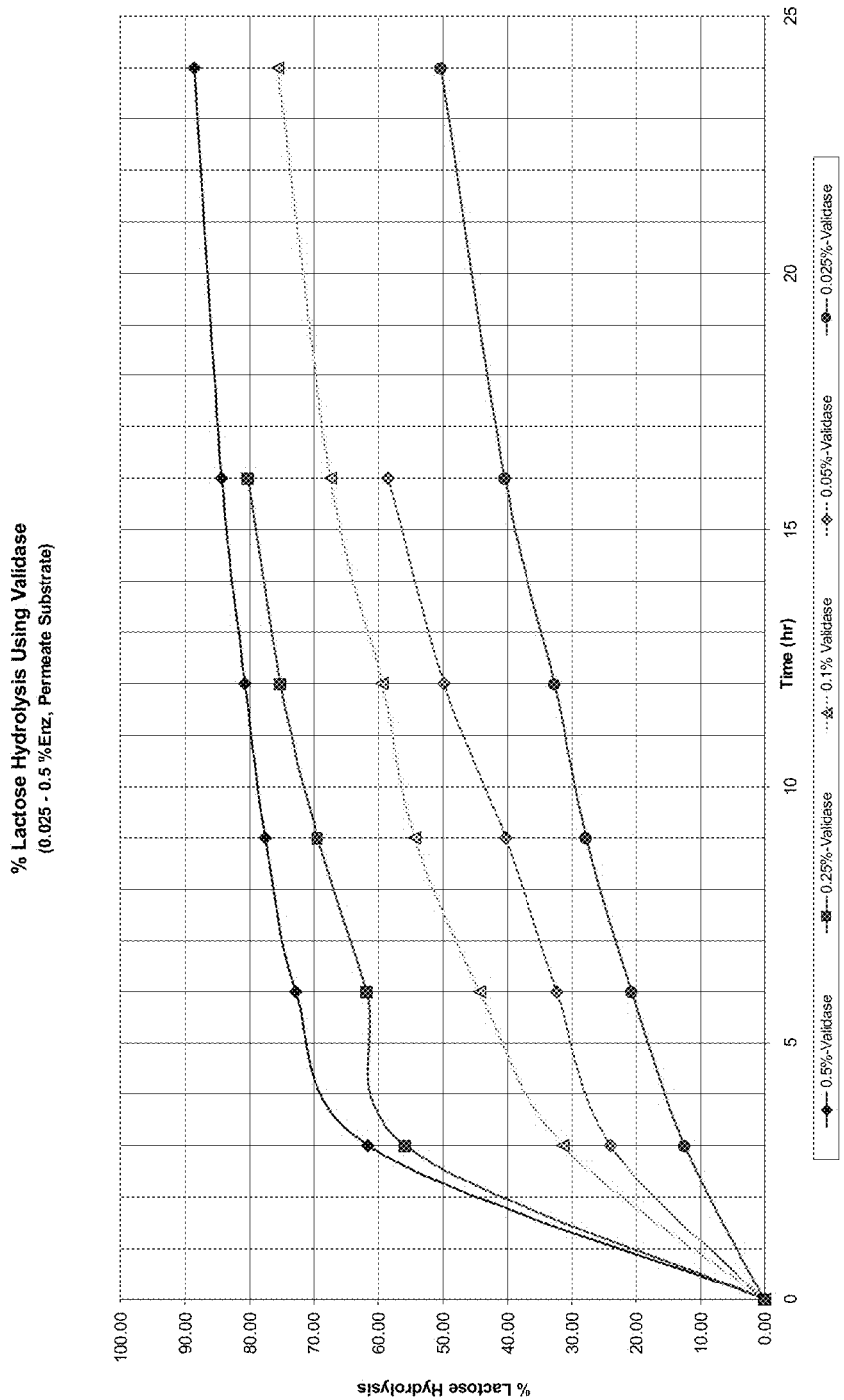
FIG. 29 is a graph of lactose hydrolysis versus time for various enzyme concentrations for the production of whey permeate hydrolysate in accordance with one embodiment of the present invention.
Figure 30:
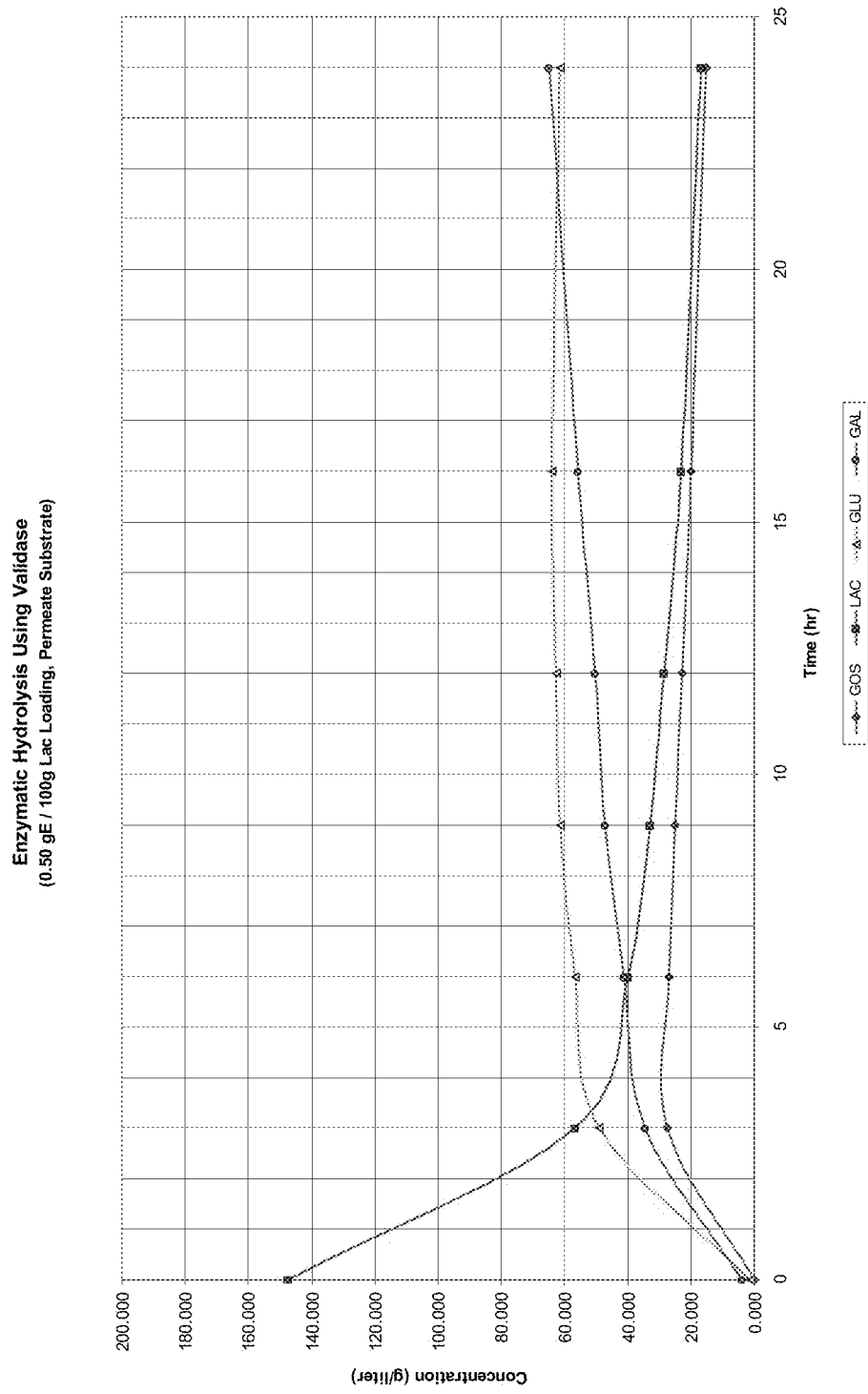
FIG. 30 is a graph of enzymatic hydrolysis in the production of whey permeate hydrolysate in accordance with one embodiment of the present invention.
Figure 31:
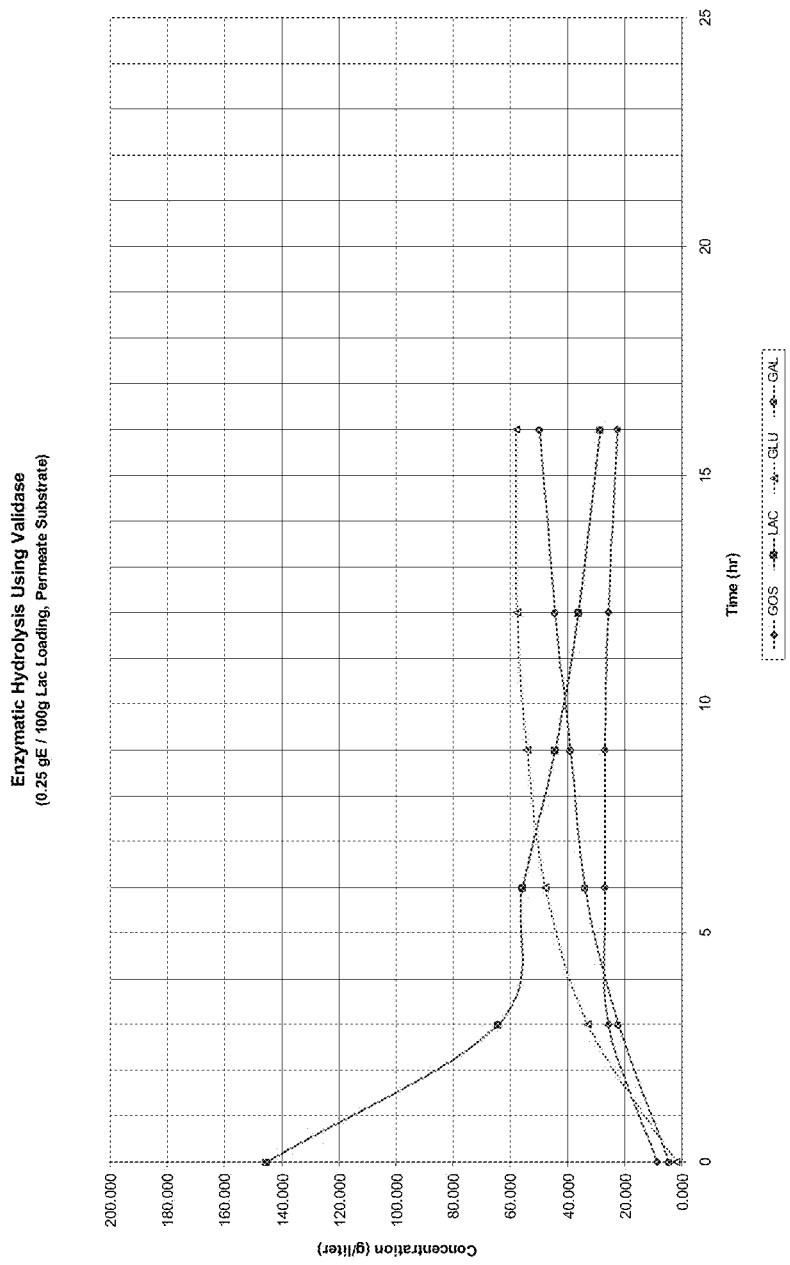
FIG. 31 is a graph of enzymatic hydrolysis in the production of whey permeate hydrolysate in accordance with one embodiment of the present invention.
Figure 32:
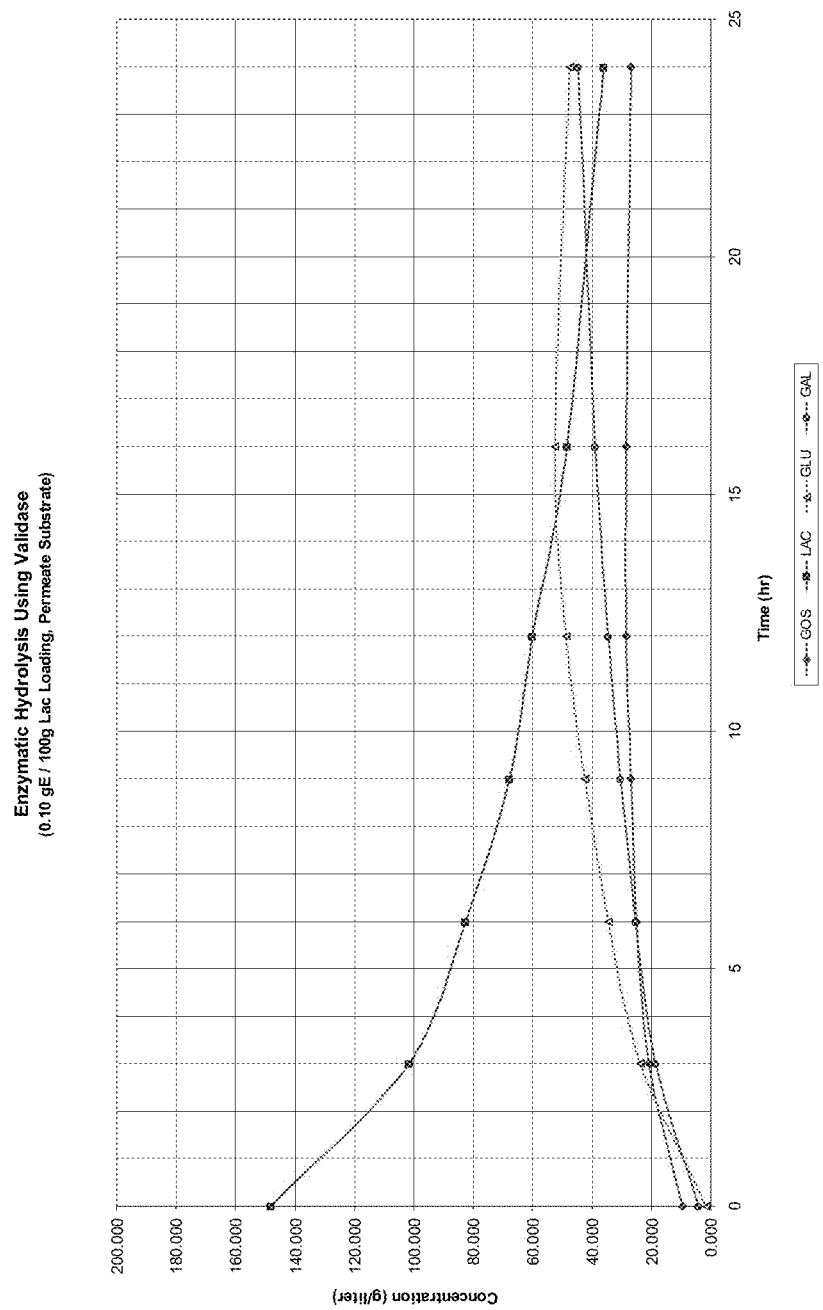
FIG. 32 is a graph of enzymatic hydrolysis in the production of whey permeate hydrolysate in accordance with one embodiment of the present invention.
Figure 33:
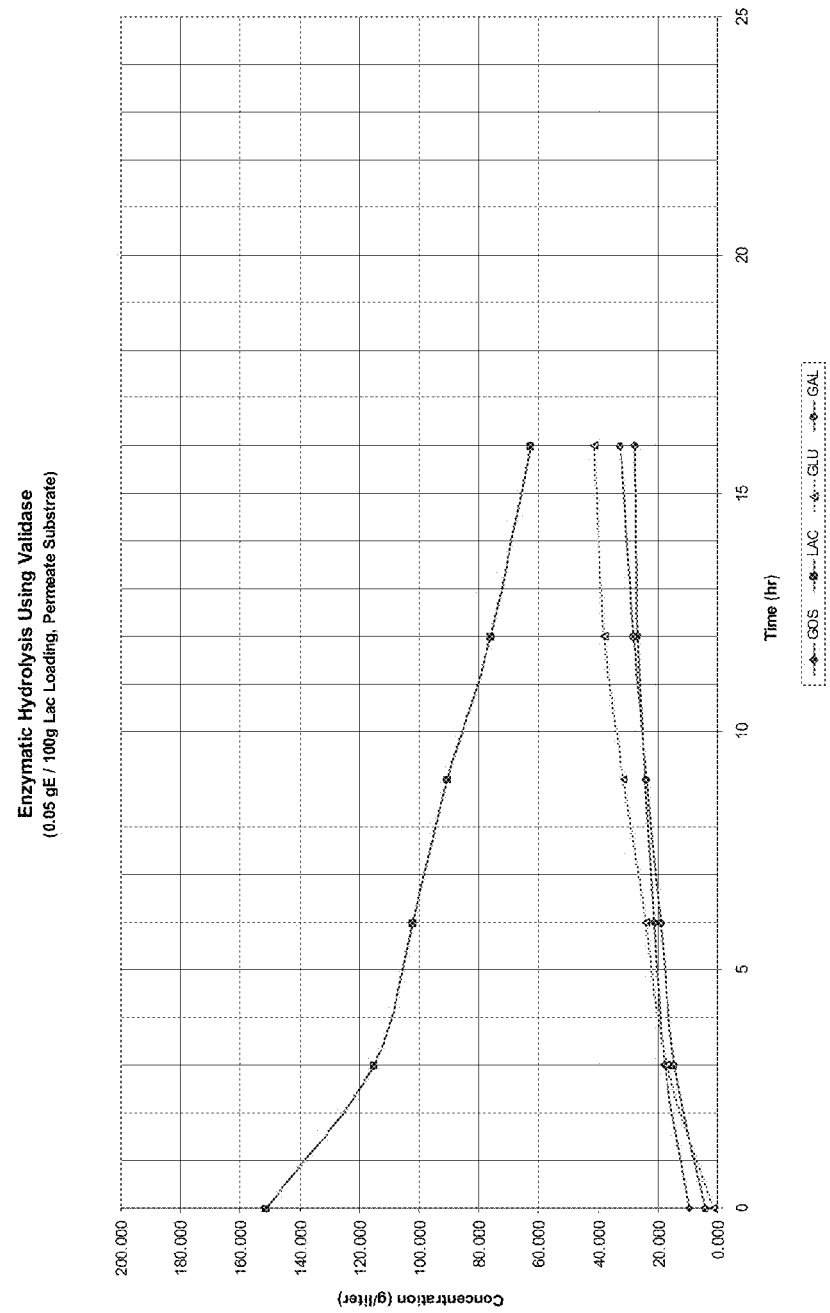
FIG. 33 is a graph of enzymatic hydrolysis in the production of whey permeate hydrolysate in accordance with one embodiment of the present invention.
Figure 34:
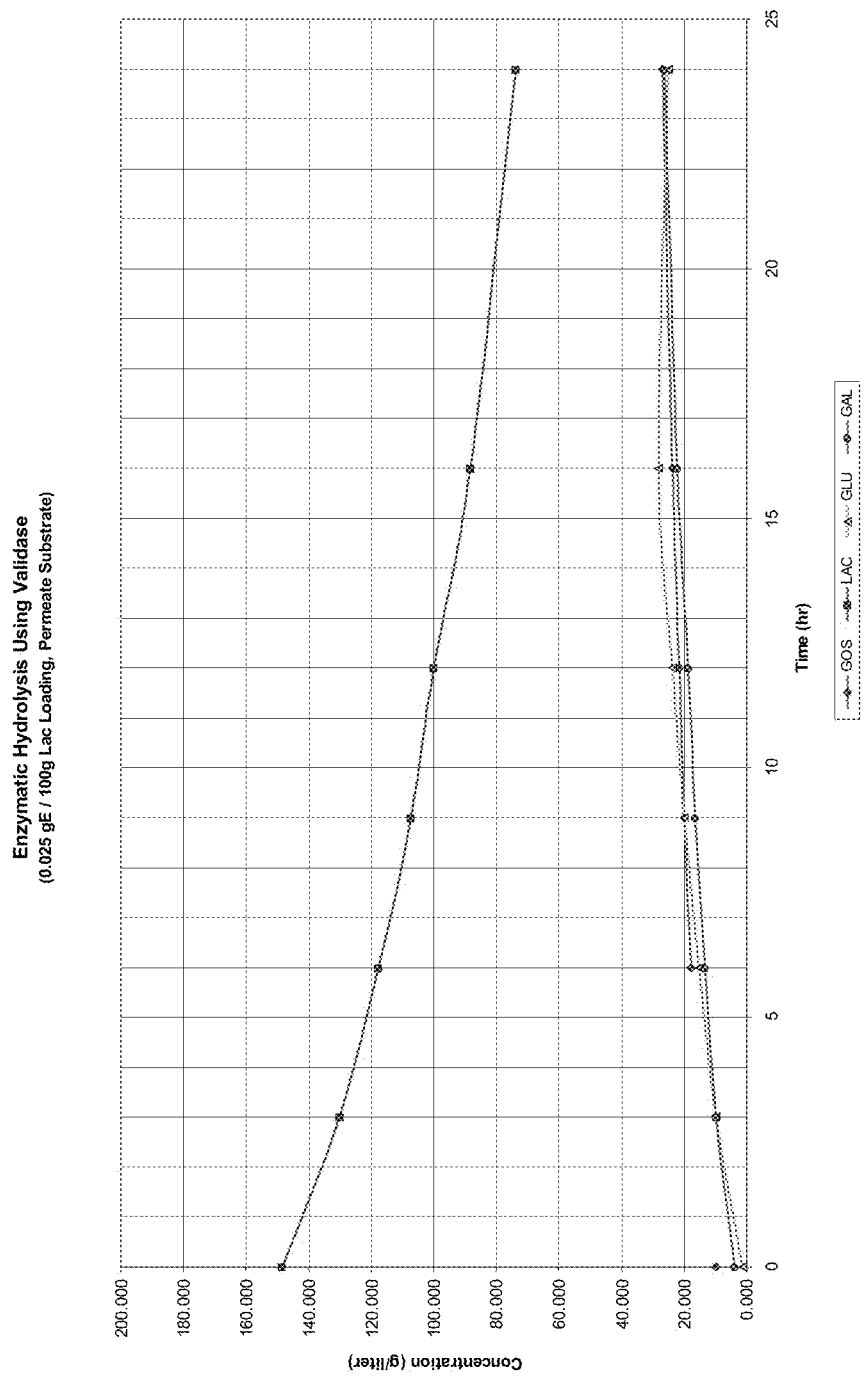
FIG. 34 is a graph of enzymatic hydrolysis in the production of whey permeate hydrolysate in accordance with one embodiment of the present invention.

FIG. 29 is a graph of lactose hydrolysis versus time for various enzyme concentrations for the production of whey permeate hydrolysate in accordance with one embodiment of the present invention.

FIGS. 30-34 are graph of enzymatic hydrolysis in the production of whey permeate hydrolysate in accordance with several embodiments of the present invention.

Figure 35:
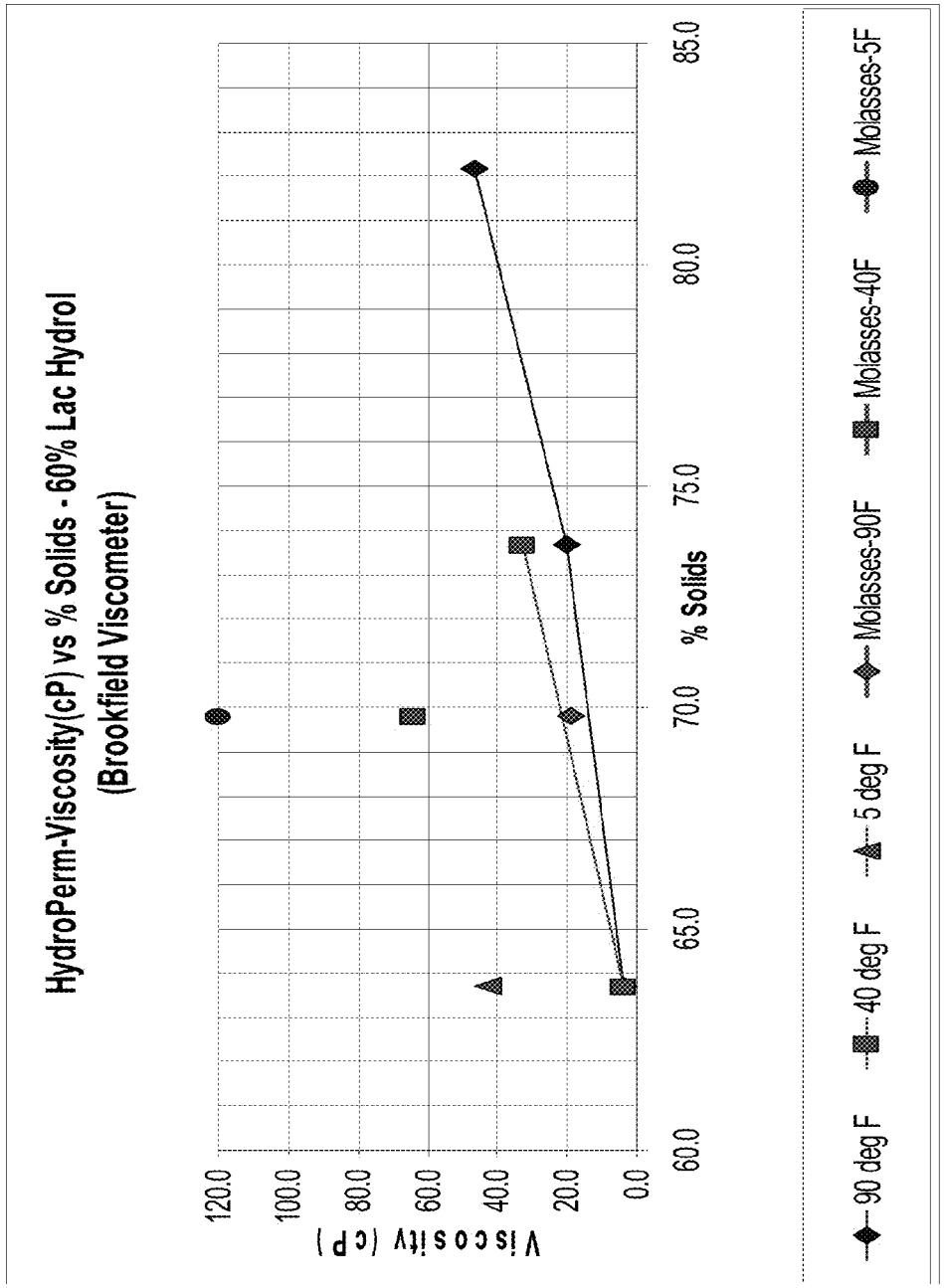
FIG. 35 is a graph of viscosity versus solids in the production of whey permeate hydrolysate concentrate in accordance with one embodiment of the present invention.

FIG. 35 is a graph of viscosity versus solids in the production of whey permeate hydrolysate concentrate in accordance with several embodiments of the present invention. This graph shows the viscosity levels that may be achieved in accordance with the present invention.

Figure 36:
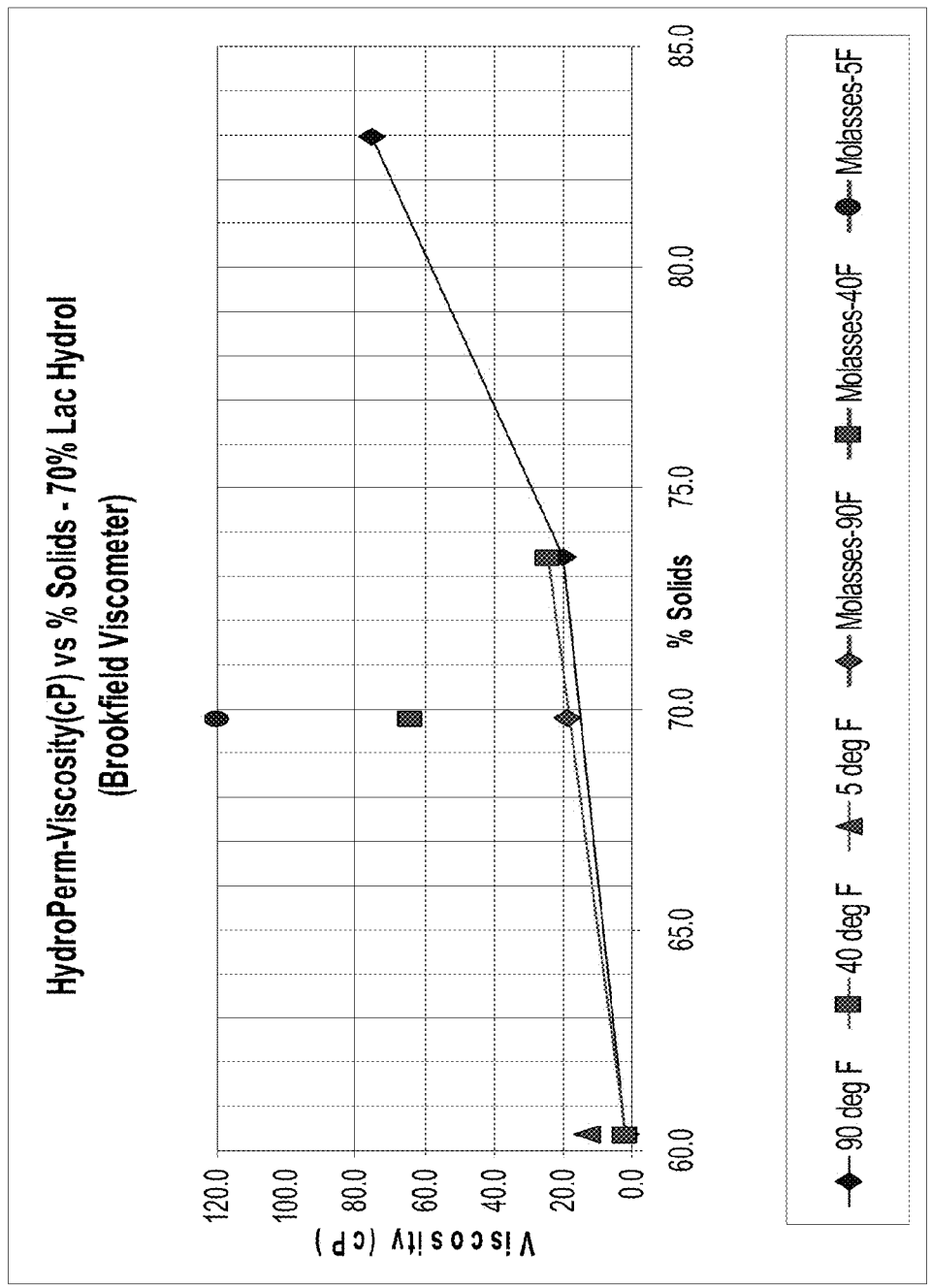
FIG. 36 is a graph of enzymatic hydrolysis in the production of whey permeate hydrolysate in accordance with one embodiment of the present invention.

FIG. 36 is a graph of enzymatic hydrolysis in the production of whey permeate hydrolysate in accordance with several embodiments of the present invention.

Figure 37:
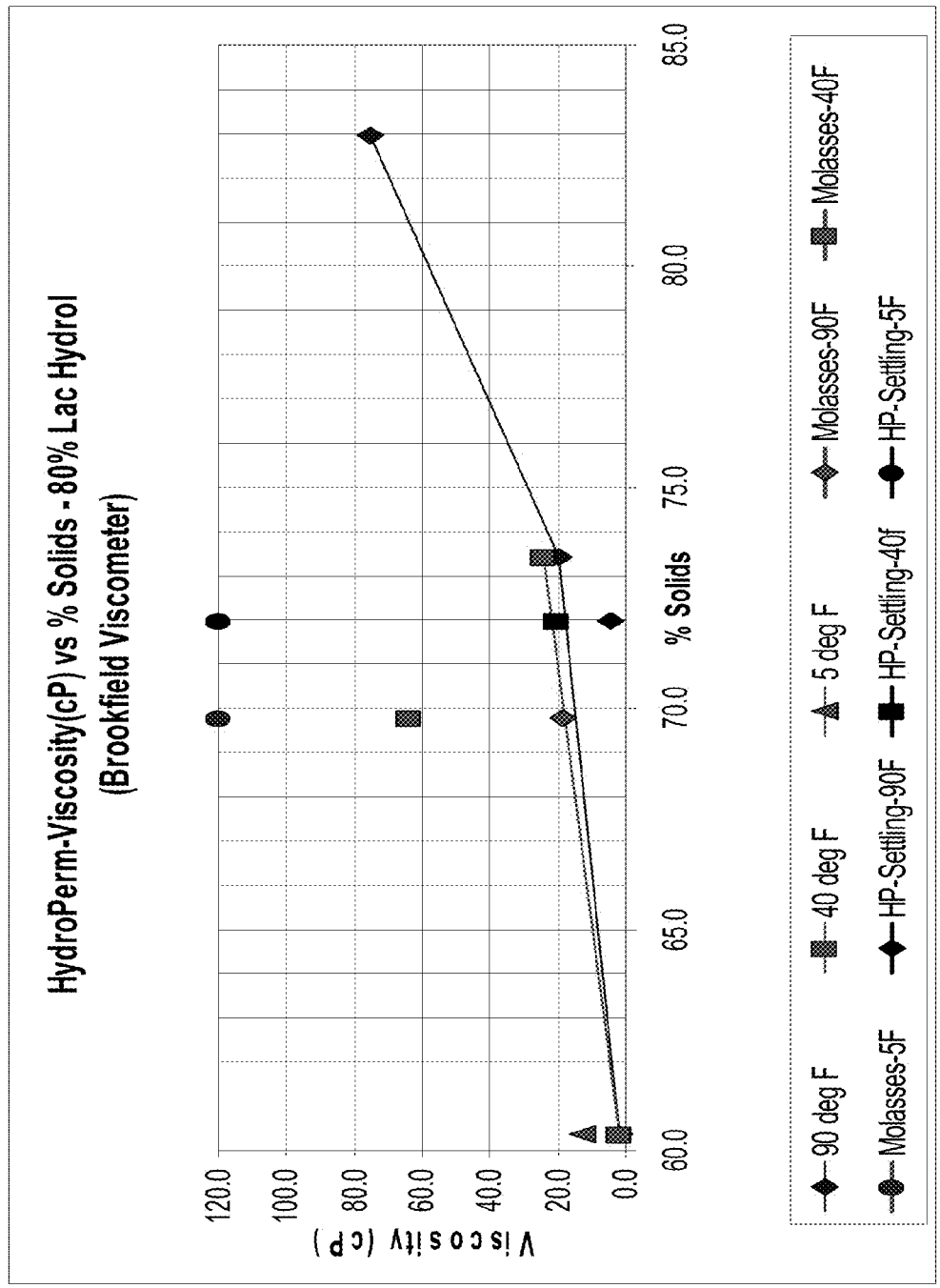
FIG. 37 is a graph of enzymatic hydrolysis in the production of whey permeate hydrolysate in accordance with one embodiment of the present invention.

FIG. 37 is a graph of enzymatic hydrolysis in the production of whey permeate hydrolysate in accordance with several embodiments of the present invention.

FIG. 38 is a table showing the data from several experiments detailing the settling profile and showing physical properties of whey permeate hydrolysate concentrate in accordance with several embodiments of the present invention. This graph shows the beneficial settling profiles that may be achieved in accordance with the present invention.

The characteristics of the NHWP prepared in accordance with this embodiment of the present invention include the ability to concentrate a hydrolyzed whey permeate to a pumpable, pourable, non-settling liquid, most preferably with 70-80% solids.

The method of the present invention allows the production of a "milk syrup" liquid which is a pumpable, pourable, non-settling liquid preferably at 75-80% solids and which contains hydrolyzed lactose components and milk minerals.

The present invention also allows for the production of a dry product with same composition as the liquid concentrate produced in accordance with the present invention. This may be done with the aid of the addition of a drying aid, such as maltodextrin, starch or other well known drying aids. The present invention therefore includes methods of producing nutritional supplements, compositions and foodstuffs using the dried form of the liquid product composition of the present invention, the compositions themselves, and methods of their use.

The dry product composition of the present invention may be used in place of a corn syrup solids replacement for ice cream and other food applications. The present invention includes methods of producing nutritional supplements, compositions and foodstuffs using the liquid product composition of the present invention as a corn syrup solids substitute, the compositions themselves, and methods of their use.

The liquid product composition of the present invention may be used as a brown rice syrup replacement in foods products as is known in the art, such as for nutrition/protein bars and the like which offer a reduced glycemic index relative to sucrose or corn syrup solids. Examples of brown rice syrup uses include use as a sweetener, or for making baked goods such cookies, crisps, granola, pies, and puddings, and may be combined with another sweetener such as maple for cakes. Thus, the present invention includes methods of producing nutritional supplements, compositions and foodstuffs using the liquid product composition of the present invention as a brown rice syrup substitute, the compositions themselves, and methods of their use.

The liquid product composition of the present invention also may find beneficial application as a molasses replacement in nutritive compositions and formulations, such as for animal feed applications. Accordingly, the present invention includes methods of producing nutritional supplements, compositions and foodstuffs using the liquid product composition of the present invention, the compositions themselves, and methods of their use.

The liquid product composition of the present invention also may be used as a liquid rumen microorganism stimulant in the same manner as described for a corresponding dry product, as described in U.S. Pat. No. 6,033,689, which is hereby incorporated herein by reference. Accordingly, the present invention includes methods of producing such a liquid rumen microorganism stimulant and methods of its use.

The liquid product composition of the present invention also may be used as a pelleted feed improvement in which the NHWP acts as a binder.

The liquid product composition of the present invention also may be applied as an agglomeration aid for fast dispersing dried milk replacement products in a wide variety of forms and for several applications.

While specific formulations and process steps are discussed, it should be understood that this is done for illustrative purposes only. A person skilled in the relevant art will recognize that other process and composition variations can be used without departing from the spirit and scope of the invention. It will be apparent to a person skilled in the relevant art that this invention can also be employed in a variety of other applications.

What is claimed is:

1. A method of producing a non-settling hydrolyzed whey permeate with an enzyme, the method comprising the steps:
   subjecting the whey permeate having an initial solids content in the range of from about 15 to about 25 percent solids to hydrolysis by an enzyme, so as to obtain a whey permeate hydrolysate having a degree of hydrolysis above about 65 percent; and
   subjecting the whey permeate hydrolysate to evaporation so as to bring the level of solids in the resulting whey permeate hydrolysate concentrate to within a range of from about 60 to about 80 percent solids, so as to obtain a whey permeate hydrolysate concentrate whose settling profile is such that there is no detectable settling over two weeks when stored at 90° F.

2. A method according to claim 1 wherein the whey permeate has an initial solids content in the range of from about 18 to about 20 percent solids.

3. A method according to claim 1 wherein the hydrolysis by the enzyme is carried out for sufficient time to bring about a degree of hydrolysis between about 65 percent and about 80 percent.

4. A method according to claim 1 wherein the evaporation is carried out so as to bring the level of solids in the whey permeate hydrolysate to within a range of from about 70 to about 75 percent solids.

5. A method according to claim 1 wherein the resulting whey permeate hydrolysate concentrate has a viscosity in the range of 90 to 120 centipoise at 90° F.

6. A method according to claim 1 wherein the resulting whey permeate hydrolysate concentrate has a galactooligosaccharides (GOS) content in the range of about 3% to 5% by weight.

7. A method according to claim 1 further comprising adding a drying agent to the whey permeate hydrolysate.

8. The method of claim 7 wherein the drying agent comprises a maltodextrin or a starch.

* * * * *